United States Patent
Kobayashi et al.

(10) Patent No.: US 11,345,323 B2
(45) Date of Patent: May 31, 2022

(54) VEHICLE DECELERATION CONTROLLER

(71) Applicant: HONDA MOTOR CO., LTD., Tokyo (JP)

(72) Inventors: Shinya Kobayashi, Wako (JP); Dai Saitoh, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 16/910,321

(22) Filed: Jun. 24, 2020

(65) Prior Publication Data
US 2020/0398804 A1 Dec. 24, 2020

(30) Foreign Application Priority Data

Jun. 24, 2019 (JP) .............................. JP2019-116766

(51) Int. Cl.
*B60T 8/32* (2006.01)
*B60T 8/171* (2006.01)
*B60T 7/06* (2006.01)

(52) U.S. Cl.
CPC ................. *B60T 8/326* (2013.01); *B60T 7/06* (2013.01); *B60T 8/171* (2013.01); *B60T 8/329* (2013.01)

(58) Field of Classification Search
CPC ...................................................... B60T 8/326
See application file for complete search history.

(56) References Cited

U.S. PATENT DOCUMENTS 6,655,749 B2 * 12/2003 Bond, III ............ B60W 50/087 303/9

FOREIGN PATENT DOCUMENTS

JP 2016-016801 A 2/2016
JP 2018-189062 A 11/2018

* cited by examiner

*Primary Examiner* — Vicky A Johnson
(74) *Attorney, Agent, or Firm* — Rankin, Hill & Clark LLP

(57) ABSTRACT

A vehicle deceleration controller includes: a brake pedal; an accelerator pedal which is operated when an acceleration/deceleration request of a vehicle is inputted; a target acceleration/deceleration setting part configured to set a target deceleration based on a deceleration operation of the accelerator pedal; and an acceleration/deceleration control part configured to, when the accelerator pedal is operated to decelerate the vehicle, provide deceleration control over the vehicle such that an actual deceleration follows the target deceleration set by the target acceleration/deceleration setting part. In a case where the brake pedal and the accelerator pedal are operated simultaneously, the acceleration/deceleration control part is configured to, when a required deceleration level based on a deceleration operation of the brake pedal is present nearer an acceleration side, compared to a previously-set reference deceleration, then provide deceleration control over the vehicle, such that the actual deceleration follows the reference deceleration.

6 Claims, 10 Drawing Sheets

VEHICLE DECELERATION CONTROLLER

CROSS REFERENCE TO RELATED APPLICATIONS

This application claims the benefit of Japanese Patent Application No. 2019-116766 filed on Jun. 24, 2019, the disclosure of which is incorporated herein by reference.

BACKGROUND OF THE INVENTION

1. Field of the Invention

The present invention relates to a vehicle deceleration controller that includes an acceleration/deceleration operator which is operated when an acceleration/deceleration request of a driver of a vehicle, including an acceleration request and a deceleration request, is inputted.

2. Description of the Related Art

Japanese Laid-Open Patent Application, Publication No. 2016-016801 (which may also be referred to as Patent Document 1) of which applicant is the same as the applicant of the present invention discloses a vehicle deceleration controller that includes an acceleration/deceleration operator which is operated when an acceleration/deceleration request of a driver of a vehicle, including an acceleration request and a deceleration request, is inputted. The vehicle deceleration controller of Patent Document 1 includes, in addition to an ordinary brake operator (a brake pedal), the acceleration/deceleration operator as described above (an acceleration pedal which is operable to gain acceleration and deceleration).

In the vehicle deceleration controller of Patent Document 1, just using a single acceleration/deceleration operator makes it possible to directly input a driver's intention (an acceleration/deceleration request). Thus, such an advantageous effect is obtained that a driver can enjoy driving fun with a simple driving operation.

Japanese Laid-Open Patent Application, Publication No. 2018-189062 (which may also be referred to as Patent Document 2) discloses a control device of a vehicle having a so-called brake override function. The control device of a vehicle of Patent Document 2 realizes the brake override function for reducing an output of an internal combustion engine as a driving source of the vehicle, when it is determined that a brake pedal and an accelerator pedal are simultaneously stepped.

In the control device of a vehicle of Patent Document 2, when it is determined that the brake pedal and the accelerator pedal are simultaneously stepped, a brake request made by the brake pedal is preferentially received. This makes it possible to realize a technical idea of fail-safe.

[Patent Document 1] Japanese Laid-Open Patent Application, Publication No. 2016-016801
[Patent Document 2] Japanese Laid-Open Patent Application, Publication No. 2018-189062

SUMMARY OF THE INVENTION

Let us assume herein an example in which the vehicle deceleration controller "equipped with an acceleration/deceleration operator which is operable to allow an input of an acceleration request and a deceleration request from a driver" of Patent Document 1 is combined with the control device of a vehicle "having a brake override function" of Patent Document 2.

In the example, those skilled in the art will understand such a configuration that, in the vehicle deceleration controller equipped with an ordinary brake operator (a brake pedal) and the above-described acceleration/deceleration operator (the acceleration pedal which is operable to gain acceleration and deceleration), if and when the acceleration/deceleration operator (the accelerator pedal) and the brake operator (the brake pedal) are simultaneously depressed, then an output of an internal combustion engine as a driving source of the vehicle is reduced.

In the above-described configuration of the vehicle deceleration controller, however, when the acceleration/deceleration operator (the accelerator pedal) and the brake operator (the brake pedal) are simultaneously depressed, it is not obvious for those skilled in the art to conceive of, for example, how much deceleration control to be provided depending on a degree of pedal depression of the acceleration/deceleration operator (the accelerator pedal).

Thus, in a case where, for example: a given degree of pedal depression of the acceleration/deceleration operator (the accelerator pedal) indicates a request for acceleration (a driver of interest desires to accelerate the vehicle); and nevertheless, the brake operator (the brake pedal) is also operated based on a request of the driver for a small amount of deceleration, then, contrary to the driver's intention, a significant deceleration control is provided. This may disadvantageously give the driver an uncomfortable feeling.

In light of the problem described above, the present invention has been made in an attempt to provide a vehicle deceleration controller that can realize a natural deceleration feeling which does not give a driver an uncomfortable feeling, even when an acceleration/deceleration operator in a single pedal mode and a brake operator are simultaneously operated.

A vehicle deceleration controller of the present invention includes: a brake operator that is operated when a brake request of a vehicle is inputted; an acceleration/deceleration operator that is operated when an acceleration/deceleration request of the vehicle is inputted; a target deceleration setting part configured to, when the acceleration/deceleration operator is operated to decelerate the vehicle, set a target deceleration based on the deceleration operation; and a deceleration control part configured to, when the acceleration/deceleration operator is operated to decelerate the vehicle, provide deceleration control over the vehicle such that an actual deceleration follows the target deceleration set by the target deceleration setting part. In the vehicle deceleration controller, in a case where the brake operator and the acceleration/deceleration operator are operated simultaneously, the deceleration control part is configured to, when a required level based on a deceleration operation of the acceleration/deceleration operator is present nearer an acceleration side, compared to a previously-set reference deceleration, then provide deceleration control over the vehicle, such that an actual deceleration follows the reference deceleration.

The vehicle deceleration controller of the present invention can realize a natural deceleration feeling which does not give a driver an uncomfortable feeling, even when the acceleration/deceleration operator and the brake operator are simultaneously operated.

DETAILED DESCRIPTION OF THE EMBODIMENTS

Figure 1:
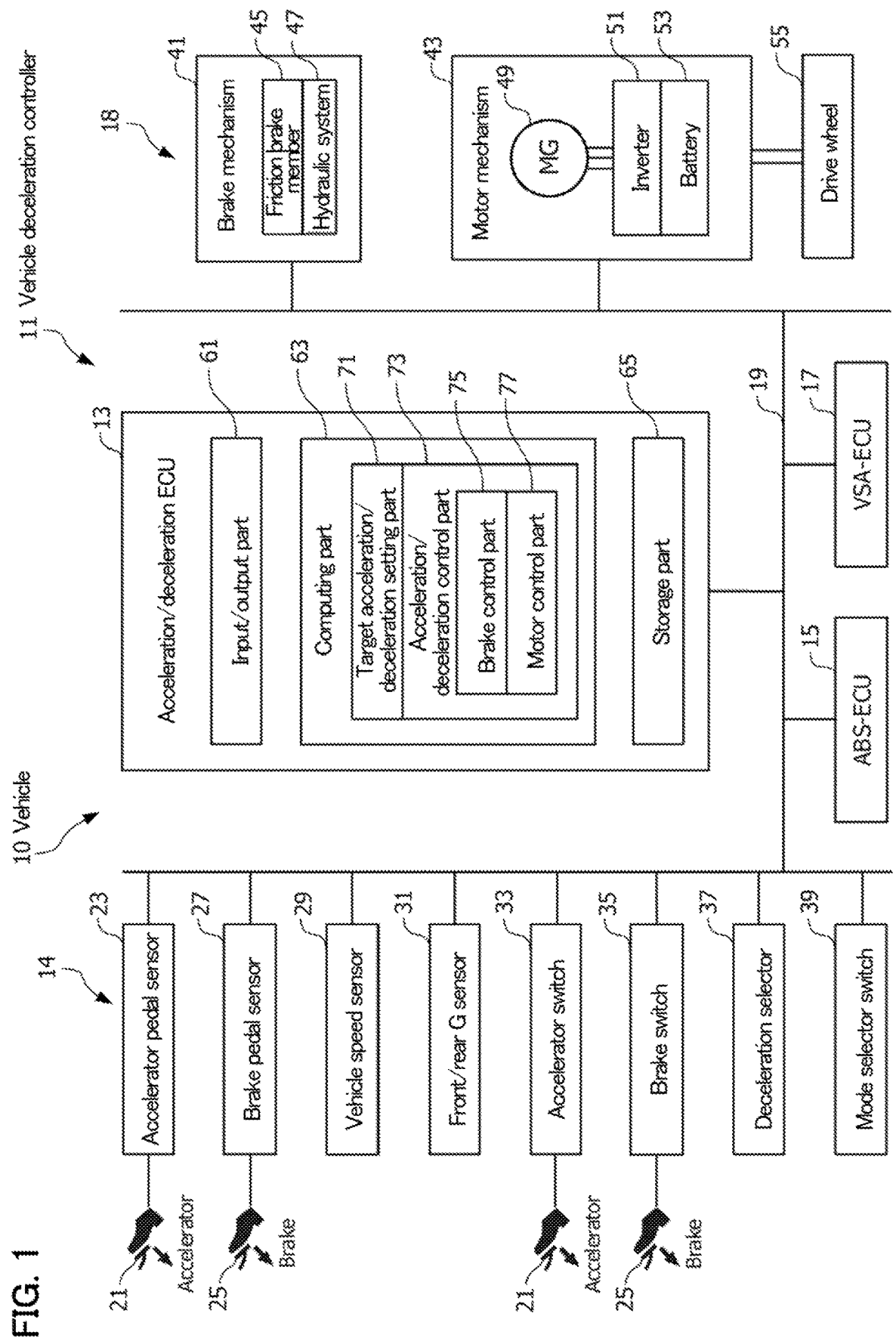
FIG. 1 is a block diagram illustrating an outline of a vehicle deceleration controller according to an embodiment of the present invention.

A vehicle deceleration controller according to an embodiment of the present invention is described below in detail with reference to related drawings.

In the related drawings illustrated hereinafter, the same reference numeral is basically assigned to members having functions same or corresponding to each other. For convenience of explanation, a size or a shape of a member may be schematically illustrated by deformation or exaggeration.

<<Outline of Vehicle Deceleration Controller 11 According to Embodiment of the Present Invention>>

Figure 2:
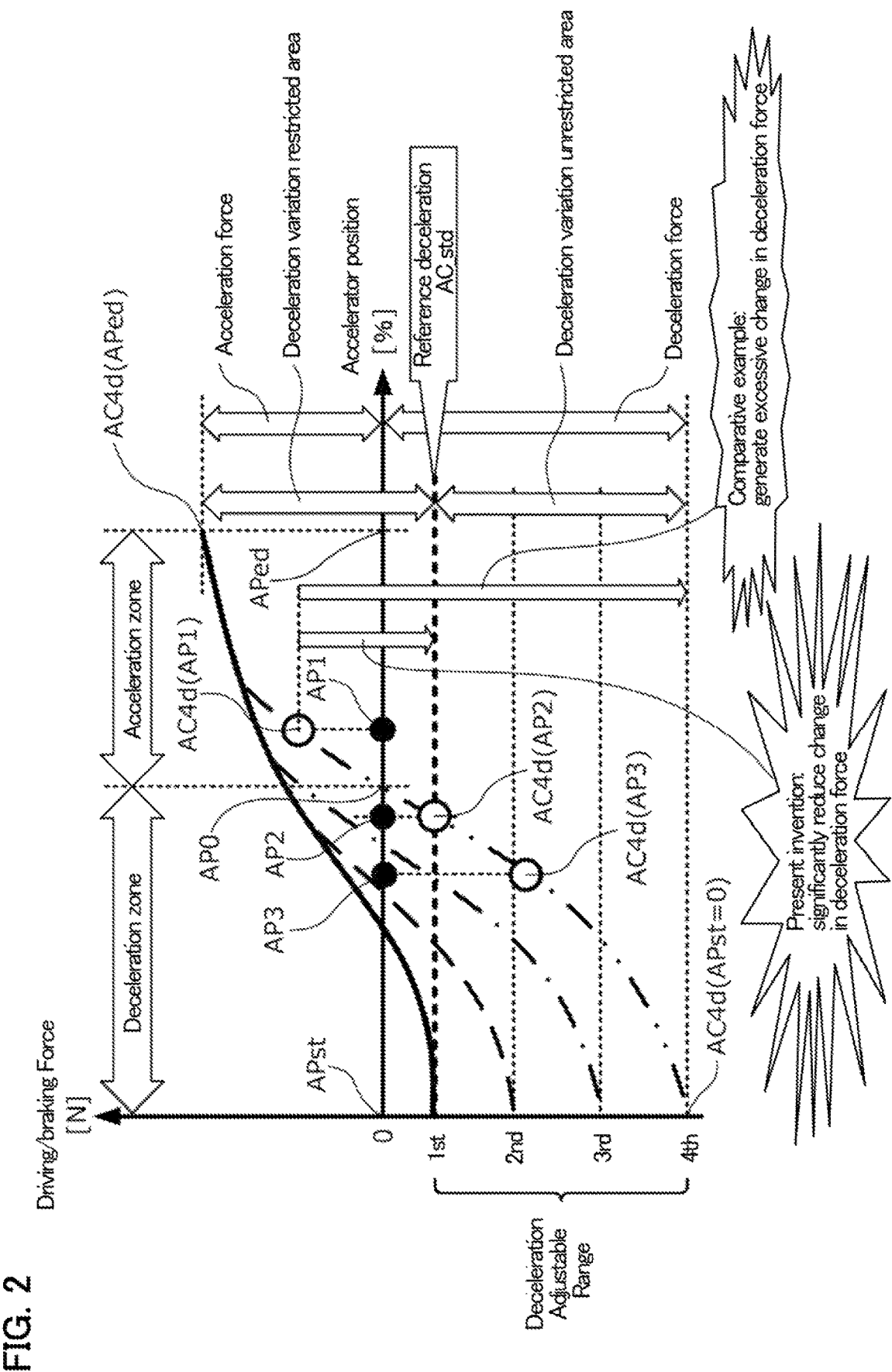
FIG. 2 is a diagram illustrating an explanatory diagram illustrating operations performed by the vehicle deceleration controller according to the embodiment.

A vehicle deceleration controller 11 is described in which a vehicle of the vehicle deceleration controller 11 is exemplified as a vehicle 10 which is an electric vehicle equipped with a motor generator 49, with reference to FIG. 1 and FIG. 2. FIG. 1 is a block diagram illustrating an outline of the vehicle deceleration controller 11. FIG. 2 is an explanatory diagram illustrating operations of the vehicle deceleration controller 11.

The vehicle deceleration controller 11 includes, as illustrated in FIG. 1: an acceleration/deceleration ECU (Electronic Control Unit) 13; an input system 14; an ABS-ECU 15; a VSA-ECU 17; and an output system 18, each of which are communicably connected to each other via a communication medium 19 such as a CAN (Control Area Network).

Each of the acceleration/deceleration ECU 13, the ABS-ECU 15, and the VSA-ECU 17 is realized by a microcomputer including a CPU (Central Processing Unit), a ROM (Read Only Memory), a RAM (Random Access Memory), or the like. The microcomputer reads and executes a program or data stored in the ROM and operates such that various functions of the each of the acceleration/deceleration ECU 13, the ABS-ECU 15, and the VSA-ECU 17 are performed and controlled.

The acceleration/deceleration ECU (Electronic Control Unit) 13 controls acceleration and deceleration of the vehicle 10. Components included in the acceleration/deceleration ECU 13 are described in detail hereinafter. The ABS-ECU 15 prevents a wheel (not illustrated) of the vehicle 10 from being locked when an operation of braking of the vehicle 10 is performed. The VSA-ECU 17 (the "VSA" is a registered trademark) assists stabilization of behaviors of the vehicle 10.

The communication medium 19 connects each other, as illustrated in FIG. 1, the following components included in the input system 14, namely, an accelerator pedal sensor 23, a brake pedal sensor 27, a vehicle speed sensor 29, a front/rear G sensor 31, an accelerator switch 33, a brake switch 35, a deceleration selector 37, and a mode selector switch 39.

The accelerator pedal sensor 23 detects an amount of pedal depression with respect to a start position of an accelerator pedal 21 (a position taken when a driver of the vehicle 10 releases a pedal depression operation). The accelerator pedal 21 is operated when the vehicle 10 is accelerated or decelerated. Information on the pedal depression amount (which may also be referred to as AP acceleration/deceleration operation amount information) detected by the accelerator pedal sensor 23 is transmitted via the communication medium 19 to each of the acceleration/deceleration ECU 13, the ABS-ECU 15, and the VSA-ECU 17.

The accelerator pedal 21 may also be referred to as an "acceleration/deceleration operator".

The brake pedal sensor 27 detects an amount of a pedal depression with respect to a start position of a brake pedal 25 (a position taken when a driver of the vehicle 10 releases a pedal depression operation). The brake pedal 25 is operated when the vehicle 10 is braked. Information on the pedal depression amount (which may also be referred to as BP deceleration operation amount information) detected by the brake pedal sensor 27 is transmitted via the communication medium 19 to each of the acceleration/deceleration ECU 13, the ABS-ECU 15, and the VSA-ECU 17.

The brake pedal 25 may also be referred to as a "brake operator".

The vehicle speed sensor 29 detects a speed of the vehicle 10 (a vehicle speed). Information on the vehicle speed detected by the vehicle speed sensor 29 is transmitted via the communication medium 19 to each of the acceleration/deceleration ECU 13, the ABS-ECU 15, and the VSA-ECU 17.

The front/rear G sensor 31 detects an acceleration/deceleration generated in front and rear directions of the vehicle 10. Information on the acceleration/deceleration in the front and rear directions detected by the front/rear G sensor 31 is transmitted via the communication medium 19 to each of the acceleration/deceleration ECU 13, the ABS-ECU 15, and the VSA-ECU 17.

The accelerator switch 33 detects whether or not a pedal depression of the accelerator pedal 21 is present (whether or not an acceleration operation is performed by a driver). Information on the acceleration operation presence/absence detected by the accelerator switch 33 is transmitted via the communication medium 19 to each of the acceleration/deceleration ECU 13, the ABS-ECU 15, and the VSA-ECU 17.

Herein, instead of the accelerator switch 33, the accelerator pedal sensor 23 may detect the presence/absence of a pedal depression of the accelerator pedal 21 by the driver. That is, in this case, the accelerator pedal sensor 23 also works as the accelerator switch 33.

The brake switch 35 detects whether or not a pedal depression of the brake pedal 25 is present (whether or not a deceleration operation is performed by the driver). Information on the deceleration operation presence/absence detected by the brake switch 35 is transmitted via the communication medium 19 to each of the acceleration/deceleration ECU 13, the ABS-ECU 15, and the VSA-ECU 17.

Herein, instead of the brake switch 35, the brake pedal sensor 27 may detect the presence/absence of a pedal depression of the brake pedal 25 by the driver (whether or not a deceleration operation is performed by the driver). That is, in this case, the brake pedal sensor 27 also works as the brake switch 35.

The deceleration selector 37 selectively sets a degree of a deceleration applied to the vehicle 10 (based on regenerative braking force of the motor generator 49). The deceleration selector 37 is disposed in, for example, a spoke of a steering wheel (both not illustrated).

In this embodiment, the number of stages in a range within which the deceleration selector 37 can adjust the degree of deceleration is, for example, as illustrated in FIG. 2, four (not specifically limited thereto). Information on the deceleration degree set by the deceleration selector 37 is transmitted via the communication medium 19 to each of the acceleration/deceleration ECU 13, the ABS-ECU 15, and the VSA-ECU 17.

The mode selector switch 39 is a switch used for changing an operation mode of the accelerator pedal 21 (to be referred to as an "AP operation mode" hereinafter). The mode selector switch 39 is disposed in, for example, an in-vehicle instrumental panel (not illustrated).

The AP operation mode herein includes: a normal mode in which only acceleration is controlled in accordance with a pedal depression amount of the accelerator pedal 21; and a single pedal mode in which acceleration and deceleration is controlled in accordance with a pedal depression/returning amount of the accelerator pedal 21. The single pedal mode will be detailed hereinafter.

The mode selector switch 39 may be set to the single pedal mode by default, thus allowing a driver to save a mode switching operation.

The communication medium 19 connects each other, as illustrated in FIG. 1, the following components included in the output system 18, namely, a brake mechanism 41 and a motor mechanism 43.

The brake mechanism 41 includes such components for friction brakes such as: a friction brake member 45 including a brake pad and a disc rotor; and a hydraulic system 47. The brake mechanism 41 generates friction braking force at a wheel of the vehicle 10 under a control instruction from the acceleration/deceleration ECU 13.

The motor mechanism 43 includes: the motor generator 49 which is a driving source of the vehicle 10; an inverter 51 which controls driving of the motor generator 49; and a battery 53 which supplies power via the inverter 51 to the motor generator 49.

The motor mechanism 43 is joined to a drive wheel 55 via a power transmission mechanism not illustrated. The motor mechanism 43: drives the vehicle 10 under an instruction of deceleration control from the acceleration/deceleration ECU 13; and performs regenerative braking according to necessity.

<<Configuration of Acceleration/Deceleration ECU 13>>

A configuration of the acceleration/deceleration ECU 13 is described with reference to FIG. 1.

The acceleration/deceleration ECU 13 includes, as illustrated in FIG. 1: an input/output part 61; a computing part 63; and a storage part 65.

The input/output part 61 allows input of such input information as: the acceleration/deceleration operation amount information (the AP acceleration/deceleration operation amount information) from the accelerator pedal sensor 23; the pedal depression amount information (the BP braking operation amount information) from the brake pedal sensor 27; the vehicle speed information from the vehicle speed sensor 29; the front/rear G information from the front/rear G sensor 31; the acceleration operation presence/absence information from the accelerator switch 33; the deceleration operation presence/absence information from the brake switch 35; information on the deceleration degree set by the deceleration selector 37; and information on the mode switching by the mode selector switch 39. The input/output part 61 also outputs such output information as: information on the friction brake instruction to the brake mechanism 41; information on driving/braking control including information on the driving control and the braking control of the motor generator 49.

The computing part 63 computes such information as information on deceleration control of the friction brake member 45 and the driving/braking control information on the motor generator 49, based on the AP acceleration/deceleration operation amount information, the BP braking operation amount information, the vehicle speed information, the front/rear G information, the acceleration operation presence/absence information, the deceleration operation presence/absence information, the deceleration degree setting information, the mode switching information, or the like. More specifically, the computing part 63 includes a target acceleration/deceleration setting part 71 and an acceleration/deceleration control part 73.

The target acceleration/deceleration setting part 71 sets a target value of acceleration/deceleration of the vehicle 10 (which may also be referred to as a "target acceleration/deceleration value"), based on the input information such as the AP acceleration/deceleration operation amount information and the BP braking operation amount information. The target acceleration/deceleration setting part 71 may also be referred to as a "target deceleration setting part".

More specifically, in the normal mode, the target acceleration/deceleration setting part 71: sets a target deceleration, based on the BP braking operation amount information; and sets a target acceleration, based on the AP acceleration/deceleration operation amount information. That is, in the normal mode, only acceleration of the vehicle 10 is controlled in accordance with the AP acceleration/deceleration operation amount information. Thus, all operations performed within a pedal depression/returning operable range of the accelerator pedal 21 (a range within which all possible values taken as the AP acceleration/deceleration operation amount information are included) are basically used for acceleration of the vehicle 10.

In the normal mode, however, a regenerative brake works as usual, which is generated when the accelerator pedal 21 is returned to or near the start position thereof (which corresponds to an engine brake of a vehicle equipped with an internal combustion engine).

In the single pedal mode, similarly to the normal mode, the target acceleration/deceleration setting part 71 sets a target deceleration (which may also be referred to as a required deceleration), based on the BP braking operation amount information. Unlike in the normal mode, however, the target acceleration/deceleration setting part 71 sets a target acceleration/deceleration (a required acceleration/deceleration) including a target deceleration (a required deceleration) and a target acceleration (a required acceleration), based on the AP acceleration/deceleration operation amount information.

A relationship between a pedal depression amount of the accelerator pedal 21 (the AP acceleration/deceleration operation amount information: an accelerator position) and a required acceleration/deceleration (required driving/braking force) corresponding thereto is described in detail with reference to FIG. 2. FIG. 2 denotes: an accelerator position (unit: %) on the abscissa; and driving/braking force (unit: N) including braking force (deceleration force) and driving force (acceleration force) on the ordinate.

In this embodiment, the range within which the deceleration selector 37 can adjust the degree of deceleration is designed to be, for example, four, as illustrated in FIG. 2. In the four-staged deceleration adjustable range, decelerations become larger in ascending order (1st<2nd<3rd<4th).

The driving/braking force with respect to the accelerator position (the AP acceleration/deceleration operation amount information) changes such that, as illustrated in FIG. 2, the larger the accelerator position, the larger the driving force (the smaller the braking force (the deceleration)), exhibiting a substantially upward-sloping curve. This can be said in any of the "1st" to "4th" stages to which deceleration of the vehicle 10 is set.

Description below is made, unless otherwise stated, assuming that the AP operation mode is set to the single pedal mode in which acceleration/deceleration control is performed in accordance with an amount of pedal depression/returning of the accelerator pedal 21. It is also assumed in the explanation that deceleration of the vehicle 10 is set to, for example, though not specifically limited to, the "4th" stage at which the largest deceleration is provided in the deceleration adjustable range (from the 1st to 4th stage) illustrated in FIG. 2.

In order to set a required deceleration desired by a driver by operating a single pedal (the accelerator pedal 21), a relationship between an amount of pedal depression of the accelerator pedal 21 (the AP acceleration/deceleration operation amount information; an accelerator position) and a required deceleration (required braking force) corresponding thereto is set such that, as illustrated in FIG. 2, in a deceleration zone to be described below, the larger a degree of pedal depression (the larger the accelerator position), the smaller the required deceleration (the required braking force).

In the pedal depression/returning operable range of the accelerator pedal 21 (the range in which all possible values taken as the accelerator positions are included), as illustrated in FIG. 2, let the "deceleration zone" be a zone for deceleration with: a starting point of a starting value APst which corresponds to a start position of the accelerator pedal 21; and an end point of a boundary threshold AP0.

Similar to the described above, a relationship between the amount of a pedal depression (the AP acceleration/deceleration operation amount information; the accelerator position) of the accelerator pedal 21 and a required acceleration (required driving force) corresponding thereto is set such that, as illustrated in FIG. 2, in an acceleration zone to be described below, the larger a degree of pedal depression (the larger the accelerator position), the larger the required acceleration (the required driving force).

In the pedal depression/returning operable range of the accelerator pedal 21 (the range in which all possible values taken as the accelerator positions are included), as illustrated in FIG. 2, let the "acceleration zone" be a zone for acceleration with: a starting point of the boundary threshold AP0; and an end point of a pedal depression limit value APed corresponding to a pedal depression limit position of the accelerator pedal 21.

How wide is each of the deceleration zone and the acceleration zone (how large is the boundary threshold AP0) varies depending on, for example, to which stage of deceleration is set in the deceleration adjustable range (from the 1st to 4th stage).

Referring back to FIG. 1, the configuration of the acceleration/deceleration ECU 13 is further described below.

The acceleration/deceleration control part 73 provides acceleration/deceleration control over the vehicle 10, based on the input information including the vehicle speed information and the front/rear G information, and information on the target acceleration/deceleration set by the target acceleration/deceleration setting part 71. In order to achieve the acceleration/deceleration control, the acceleration/deceleration control part 73 includes a brake control part 75 and a motor control part 77. The acceleration/deceleration control part 73 may also be referred to as a "deceleration control part".

The brake control part 75 provides control over braking, using the brake mechanism 41 capable of applying friction braking force, based on the target acceleration/deceleration set by the target acceleration/deceleration setting part 71. The motor control part 77 provides control over driving and braking, using driving force of the motor generator 49 and the motor mechanism 43 capable of applying regenerative braking force, based on the target acceleration/deceleration set by the target acceleration/deceleration setting part 71.

The storage part 65 is realized by a non-volatile memory and a volatile memory, both not illustrated. The non-volatile memory: is, for example, a flash memory or an EEP ROM (Electrically Erasable Programmable Read Only Memory); and stores therein a program or the like for executing various processings performed by the computing part 63. The volatile memory: is, for example, a DRAM (Dynamic Random Access Memory); and temporarily stores therein information on input and output or computation results, when the computing part 63 executes various processings.

The storage part 65 stores therein a value of a reference deceleration AC_std. The reference deceleration AC_std is referenced when a target deceleration in control over deceleration of the vehicle 10 is determined, in a case where: the operation mode of the accelerator pedal 21 is the single pedal mode; and the brake pedal 25 and the accelerator pedal 21 are operated simultaneously. The determination is made based on whether or not a required level (a required deceleration) AC_dm based on a deceleration operation of the accelerator pedal 21 is present nearer an acceleration side, compared to the reference deceleration AC_std (AC_dm−AC_std>0?).

More specifically, the reference deceleration AC_std is a value of deceleration and is designed such that a difference between itself and the required level AC_dm determined based on the deceleration operation of the accelerator pedal 21 is kept within a prescribed tolerable range, in the case where: the operation mode of the accelerator pedal 21 is the single pedal mode; and the brake pedal 25 and the accelerator pedal 21 are operated simultaneously. This can prevent a target deceleration (a required deceleration) from changing significantly and thereby prevent a driver from feeling uncomfortable.

In this embodiment, the reference deceleration AC_std is set to the "1st stage", which is the smallest deceleration in the deceleration adjustable range (from the 1st to 4th stage) illustrated in FIG. 2.

<<Operations of Vehicle Deceleration Controller 11 According to Embodiment of the Present Invention>>

Figure 3:
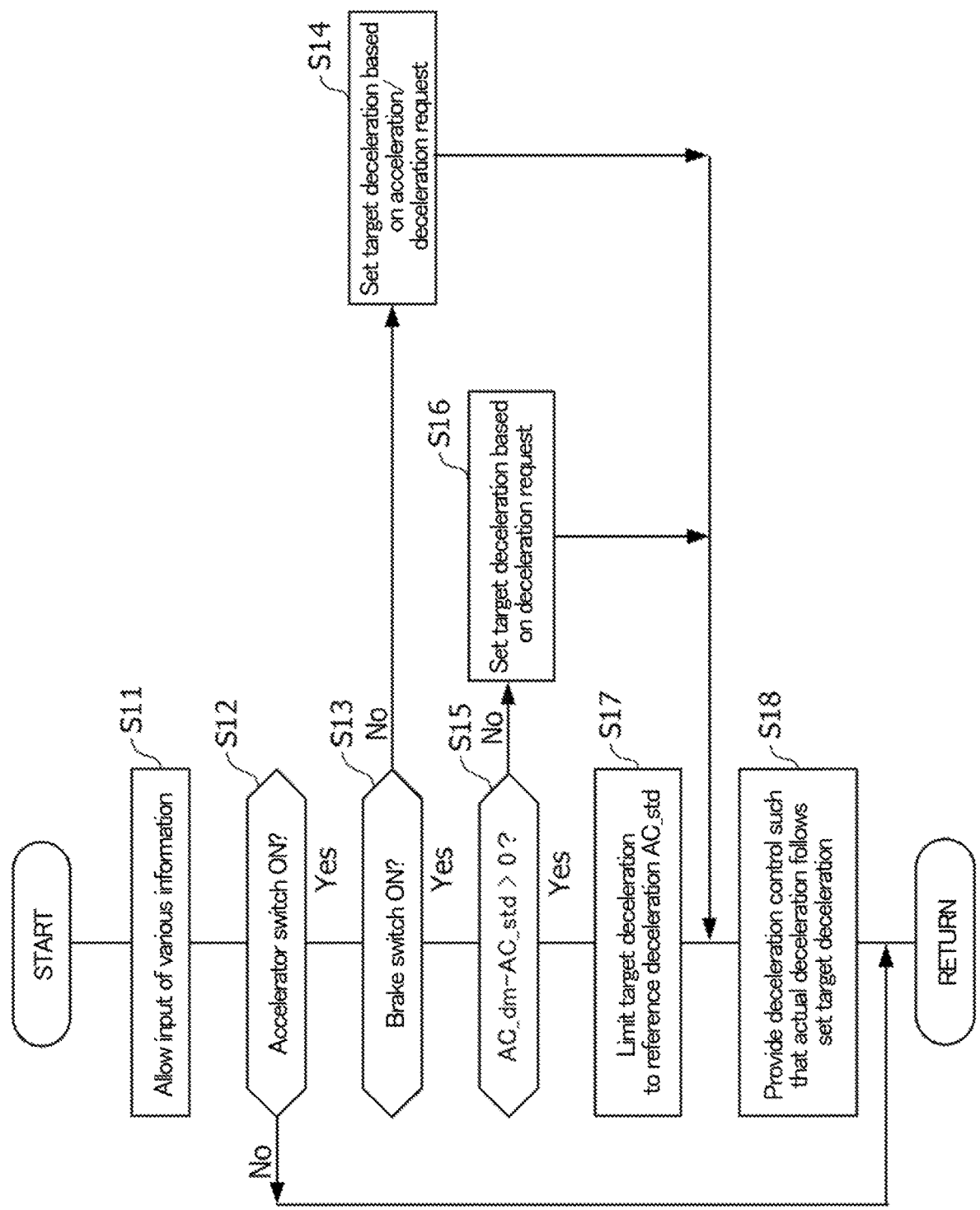
FIG. 3 is a flowchart for explaining the operations performed by the vehicle deceleration controller according to the embodiment.

Next are described operations of the vehicle deceleration controller 11 with reference to FIG. 3 according to the embodiment of the present invention. FIG. 3 is a flowchart for explaining the operations of the vehicle deceleration controller 11.

It is assumed herein that: the AP operation mode is set to the single pedal mode; and a deceleration of the vehicle 10 is set to the "4th", which is the largest deceleration in the deceleration adjustable range (from the 1st to 4th stage) illustrated in FIG. 2.

A processing from step S11 to step S18 is repeatedly performed in a prescribed cycle time.

In step S11 in FIG. 3, the input/output part 61 of the acceleration/deceleration ECU 13 allows input of various information via the communication medium 19, including: the AP acceleration/deceleration operation amount information (the accelerator position); the BP braking operation amount information; the vehicle speed information; the front/rear G information; the acceleration operation presence/absence information from the accelerator switch 33; the deceleration operation presence/absence information from the brake switch 35; the information from the deceleration selector 37; and the information from the mode selector switch 39.

In step S12, the acceleration/deceleration ECU 13: references the acceleration operation presence/absence information from the accelerator switch 33; and thereby determines whether or not the accelerator switch 33 is turned ON, that is, whether or not the accelerator pedal 21 is depressed.

If it is determined in step S12 that the accelerator switch 33 is not turned ON, that is, the accelerator pedal 21 is not depressed (if "No" in step S12), the acceleration/deceleration ECU 13 terminates the processing.

Alternatively, if it is determined in step S12 that the accelerator switch 33 is turned ON, that is, the accelerator pedal 21 is depressed (if "Yes" in step S12), the acceleration/deceleration ECU 13 advances the processing to step S13.

In step S13, the acceleration/deceleration ECU 13: references the deceleration operation presence/absence information from the brake switch 35; and thereby determines whether or not the brake switch 35 is turned ON, that is, whether or not the brake pedal 25 is depressed.

If it is determined in step S13 that the brake switch 35 is not turned ON, that is, the pedal 25 is not depressed (if "No" in step S13), the acceleration/deceleration ECU 13 advances the processing to step S14.

Alternatively, if it is determined in step S13 that the brake switch 35 is turned ON, that is, whether or not the brake pedal 25 is depressed (if "Yes" in step S13), the acceleration/deceleration ECU 13 advances the processing to step S15.

In step S14, the target acceleration/deceleration setting part 71 of the acceleration/deceleration ECU 13 sets a target deceleration (a required deceleration) as a value based on the acceleration/deceleration operation amount information (an acceleration/deceleration request) from the accelerator pedal sensor 23. After step S14, the acceleration/deceleration ECU 13 advances the processing to step S18.

In step S15, the acceleration/deceleration ECU 13 determines whether or not a required level (a required deceleration) AC_dm based on a deceleration operation of the accelerator pedal 21 is present nearer the acceleration side, compared to the reference deceleration AC_std (AC_dm−AC_std>0?).

Let us assume herein a case in which an accelerator position is AP1 (see FIG. 2). If and when the brake pedal 25 and the accelerator pedal 21 are operated simultaneously, in the example illustrated in FIG. 2, driving force (acceleration force) corresponding to the accelerator position (AP1) is AC4d (AP1). At this time, given that, in a comparative example, a BOS (brake override system) function is activated, then the accelerator position (AP1) is corrected to "APst=0".

After the correction, the driving force (the deceleration force) corresponding to the corrected accelerator position (APst=0) is AC4d (APst=0). As a result, an excessive increase in the deceleration force as much as "AC4d (AP1)−AC4d (APst=0)" is generated, which causes a driver to feel uncomfortable due to hard braking.

Thus, in this embodiment, in the case where: the brake pedal 25 and the accelerator pedal 21 are operated simultaneously; and the required level (the required deceleration) AC_dm=AC4d (AP1), based on the deceleration operation (the accelerator position: AP1) of the accelerator pedal 21 is present nearer the acceleration side, compared to the reference deceleration AC_std, then the required level (the required deceleration) AC_dm is limited to the reference deceleration AC_std. This makes it possible to significantly reduce a change in the deceleration force, compared to the comparative example.

Note that the case where the required level (the required deceleration) AC_dm=AC4d (AP1) based on the deceleration operation (the accelerator position: AP1) of the accelerator pedal 21 is present nearer the acceleration side, compared to the reference deceleration AC_std, herein means a case where the required level AC4d (AP1) is included in a deceleration variation restricted area illustrated in FIG. 2 (Reference deceleration AC_std<Deceleration<AC4d (APed)).

Note that an accelerator position corresponding to the reference deceleration AC_std is "AP2" in the example illustrated in FIG. 2.

In sum, in this embodiment, in the case where: the brake pedal 25 and the accelerator pedal 21 are operated simultaneously; and the required level of AC4d (AP1) based on the deceleration operation of the accelerator pedal 21 is present nearer the acceleration side, compared to the reference deceleration AC_std, then a variation range of the deceleration force can be reduced to "AC4d (AP1)−AC4d (AP2)" which is as relatively small as deceleration force when the accelerator position is changed from AP1 to AP2.

If the accelerator position is AP3 (see FIG. 2), in a case where: the brake pedal 25 and the accelerator pedal 21 are operated simultaneously; and the required level (the required deceleration) of "AC_dm=AC4d (AP3)" based on the deceleration operation (the accelerator position: AP3) of the accelerator pedal 21 is present nearer a deceleration side, compared to the reference deceleration AC_std, then the required level AC4d (AP3) is applied to as it is without limitation (the BOS function is practically disabled). This makes it possible to significantly reduce a change in the deceleration force, compared to the comparative example.

Herein, the case where the required level (the required deceleration) of AC4d (AP3), based on the deceleration operation (the accelerator position: AP3) of the accelerator pedal 21 is present nearer the deceleration side, compared to the reference deceleration AC_std, means a case where the required level of AC4d (AP3) is included in a deceleration variation unrestricted area illustrated in FIG. 2 (AC4d (APst)<Deceleration<Reference deceleration AC_std).

Referring back to FIG. 3, if it is determined in step S15 that the required level (the required deceleration) AC_dm based on the deceleration operation of the accelerator pedal 21 is not present nearer the acceleration side, compared to the reference deceleration AC_std (if "No" in step S15), the acceleration/deceleration ECU 13 advances the processing to step S16.

Alternatively, if it is determined in step S15 that the required level (the required deceleration) AC_dm based on the deceleration operation of the accelerator pedal 21 is present nearer the acceleration side, compared to the reference deceleration AC_std (if "Yes" in step S15), the acceleration/deceleration ECU 13 advances the processing to step S17.

In step S16, the target acceleration/deceleration setting part 71 of the acceleration/deceleration ECU 13 sets a target deceleration (a required deceleration) to a value obtained based on the acceleration/deceleration operation amount information (the deceleration request) from the accelerator pedal sensor 23. After step S16, the acceleration/deceleration ECU 13 advances the processing to step S18.

In step S17, the target acceleration/deceleration setting part 71 of the acceleration/deceleration ECU 13 limits the target deceleration (the required deceleration) to the reference deceleration AC_std. After step S17, the acceleration/deceleration ECU 13 advances the processing to step S18.

In step S18, the acceleration/deceleration control part 73 of the acceleration/deceleration ECU 13 provides deceleration control over the vehicle 10 such that an actual deceleration follows the target deceleration (the required deceleration) set in each of steps S14, S16, and S17. After that, the acceleration/deceleration ECU 13 terminates the processing.

The processing from step S15 (Yes) to S17 to S18 corresponds to the case where, as illustrated in FIG. 2: the brake pedal 25 and the accelerator pedal 21 are operated simultaneously; and the required level (the required deceleration) "AC_dm=AC4d (AP1)", based on the deceleration operation (the accelerator position: AP1) of the accelerator pedal 21 is present nearer the acceleration side, compared to the reference deceleration AC_std.

The processing from step S15 (No) to S16 to S18 corresponds to the case where, as illustrated in FIG. 2: the brake pedal 25 and the accelerator pedal 21 are operated simultaneously; and the required level (the required deceleration) of "AC_dm=AC4d (AP3)" based on the deceleration operation (the accelerator position: AP3) of the accelerator pedal 21 is present nearer the deceleration side, compared to the reference deceleration AC_std.

<<Basic Operations of Vehicle Deceleration Controller 11 with Reference to Timing Diagram>>

Figure 4A:
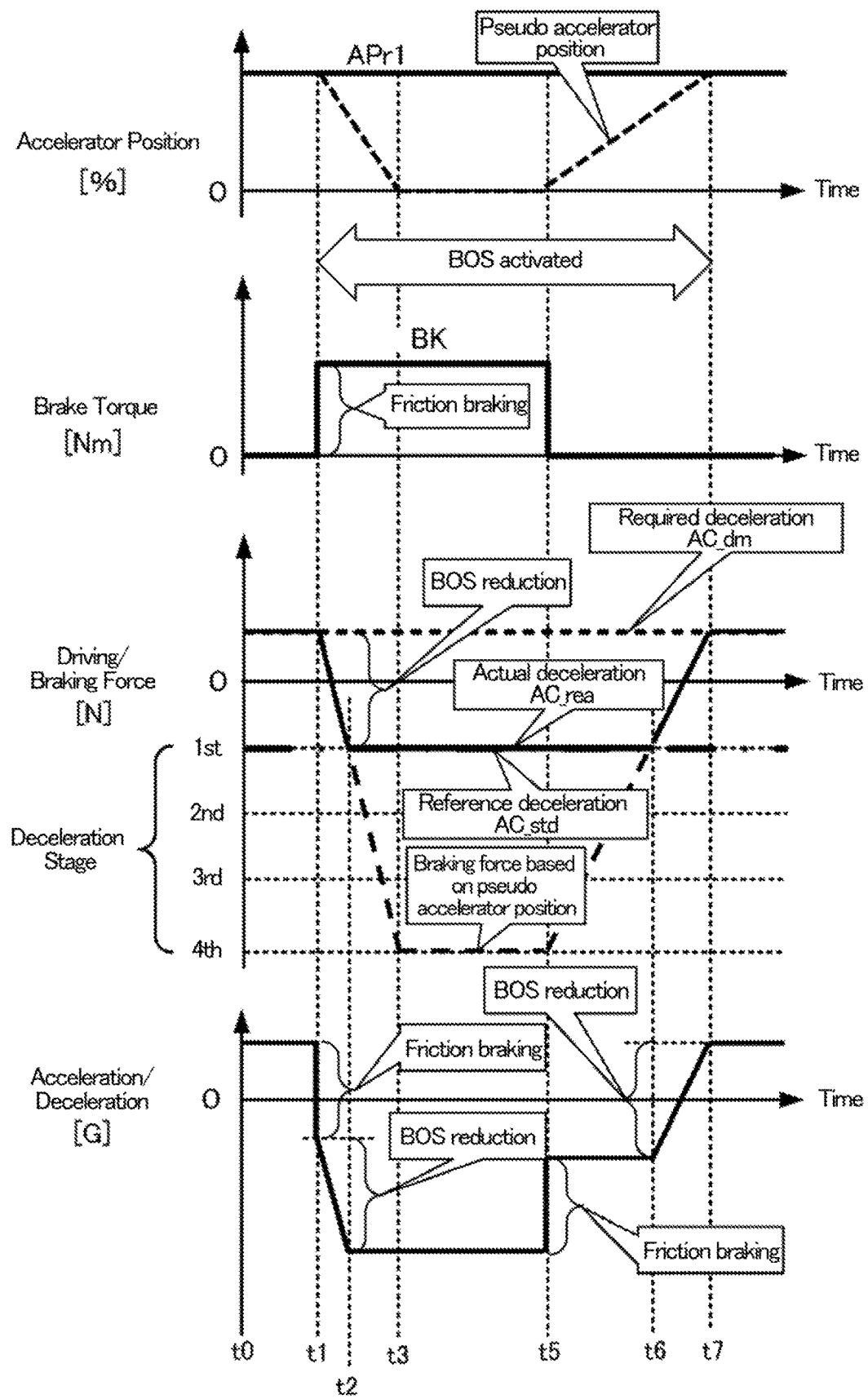
FIG. 4A is a timing diagram for explaining basic operations performed by the vehicle deceleration controller according to the embodiment.
Figure 4B:
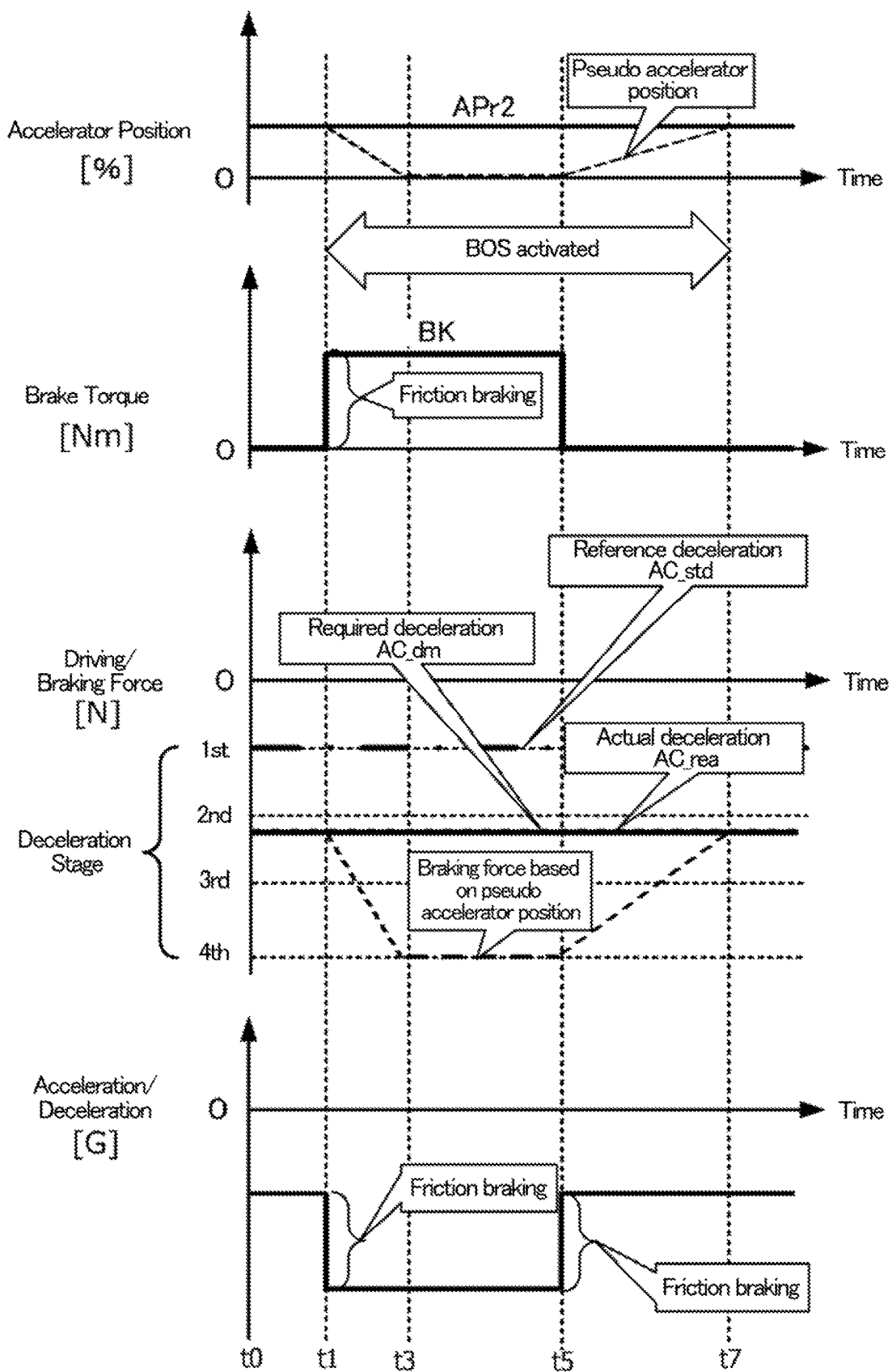
FIG. 4B is a timing diagram for explaining another basic operations performed by the vehicle deceleration controller according to the embodiment.

Basic operations performed by the vehicle deceleration controller 11 are described with reference to FIG. 4A and FIG. 4B, by taking two cases as examples, in each of which: the operation mode of the accelerator pedal 21 is the single pedal mode; and the brake pedal 25 and the accelerator pedal 21 are operated simultaneously. In one of the two cases, a required level (a required deceleration) AC_dm based on a deceleration operation is larger than the reference deceleration AC_std; and, in the other, smaller. FIG. 4A and FIG. 4B are timing diagrams for explaining respective basic operations performed by the vehicle deceleration controller 11 in the former and the latter cases, respectively.

<Case where Required Level (Required Deceleration) AC_dm is Larger than Reference Deceleration AC_std>

Basic operations performed by the vehicle deceleration controller 11 are described in a case where a required level (a required deceleration) AC_dm based on a deceleration operation of the accelerator pedal 21 is larger than the reference deceleration AC_std, with reference to FIG. 4A.

In FIG. 4A, from time t0 to t1, an operation state (an accelerator position, unit: %) of the accelerator pedal 21 shows a prescribed accelerator position APr1. From time t0 to t1, an operation state (a brake torque, unit: Nm) of the brake pedal 25 shows "without operation" (the brake torque=zero). An output state (an actual deceleration AC_rea, unit: N) of driving/braking force by the motor generator 49 shows a value in accordance with the accelerator position APr1 (a value corresponding to "Required deceleration AC_dm=AC4d (APr1)"). An output state of an acceleration/deceleration (unit: G) applied to the vehicle 10 shows, similar to that of the driving/braking force, a value in accordance with the accelerator position APr1.

Note that during a time period from time t0 to t1, the required deceleration AC_dm is equal to the actual deceleration AC_rea.

From time t1 to t3 in FIG. 4A, the operation state (the accelerator position) of the accelerator pedal 21 continues to be the prescribed accelerator position APr1. At time t1, the operation state of the brake pedal 25 is changed from "without operation" (the brake torque=zero) to "with operation" (the brake torque=BK). That is, at time t1, the brake pedal 25 and the accelerator pedal 21 are operated simultaneously. As a result, the BOS (brake override system) is activated from time t1 as a starting point through time t7 illustrated in FIG. 4A.

From time t1 to t3, in response to the activation of the BOS, a pseudo accelerator position exhibits a linear gradual decrease from APr1 to zero, in spite of the operation state (the accelerator position APr1) of the accelerator pedal 21. A change rate of the gradual decrease of the pseudo accelerator position is set to, for example, a constant rate such as "APr1/second" in which the pseudo accelerator position linearly and gradually decreases from APr1 to zero by a prescribed unit time.

The pseudo accelerator position used herein means a pseudo deceleration request level (a required deceleration) calculated under control performed by the acceleration/deceleration ECU 13. The pseudo accelerator position is used as a temporary substitute of an actual deceleration request level (the accelerator position APr1) of the accelerator pedal 21.

From time t1 to t3, the operation state of the brake pedal 25 continues to be "with operation" (the brake torque=BK).

From time t1 to t2 as a former half of a time period from time t1 to t3, the output state (the actual deceleration AC_rea) of the driving/braking force by the motor generator 49 exhibits a gradual linear decrease from the original driving force AC4d (APr1) to the reference deceleration AC_std (indicated by a dashed-dotted line, hereinafter the same), in accordance with the linear gradual decrease of the pseudo accelerator position from APr1 to zero. Herein, a decrease in the output state (the actual deceleration AC_rea) of the driving/braking force by the motor generator 49 is limited to a level corresponding to the reference deceleration AC_std. The reason for setting such a limit is as follows.

The reference deceleration AC_std is the smallest deceleration in the deceleration adjustable range (from the 1st to 4th stage) of the vehicle 10 as illustrated in FIG. 2. Thus, even when a required level (a required deceleration) based on the deceleration operation of the accelerator pedal 21 is included in the deceleration variation restricted area illustrated in FIG. 2, a variation range of the deceleration force (reduced by the BOS: see FIG. 4A) can be controlled within a moderate tolerance.

From time t2 to t3 as a latter half of the time period from time t1 to t3, the output state (the actual deceleration AC_rea) of the driving/braking force by the motor generator 49 maintains the level corresponding to the reference deceleration AC_std, though the pseudo accelerator position exhibits a linear gradual decrease from APr1 to zero. This occurs for the same reason as why the decrease in the output state (the actual deceleration AC_rea) of the driving/braking force by the motor generator 49 is limited to the level corresponding to the reference deceleration AC_std.

From time t2 to t3, in the comparative example in which such a BOS control for limiting the decrease in the output state of the driving/braking force by the motor generator 49 to the level corresponding to the reference deceleration AC_std is not performed, the output state of the driving/braking force by the motor generator 49 exhibits a linear gradual decrease from the reference deceleration AC_std to braking force (deceleration force) corresponding to a deceleration stage of interest (the 4th stage), in accordance with the linear gradual decrease of the pseudo accelerator position from APr1 to zero.

At time t1 during the time period from time t1 to t3, the output state of the acceleration/deceleration applied to the vehicle 10 exhibits a steep decrease in an acceleration as large as that corresponding to the driving force (the acceleration force) from time t0 to t1, by an amount corresponding to friction braking (the brake torque BK), in accordance with a steep increase of the brake torque from zero to BK.

From time t1 to t2 as the former half of the time period from time t1 to t3, the output state of the acceleration/deceleration applied to the vehicle 10 exhibits a linear gradual decrease in a deceleration after the steep decrease at time t1, by an amount corresponding to the reduction by the BOS (see FIG. 4A), in accordance with the linear gradual decrease of the pseudo accelerator position from APr1 to zero from time t1 to t3.

From time t2 to t3 as the latter half of the time period from time t1 to t3, the output state of the acceleration/deceleration applied to the vehicle 10 maintains the deceleration which has steeply decreased at time t1, and, during a time period from time t1 to t2, reduced by the BOS.

From time t3 to t5 illustrated in FIG. 4A, the operation state (the accelerator position) of the accelerator pedal 21 continues to be the prescribed accelerator position APr1. From time t3 to t5, the BOS continues to be activated.

From time t3 to t5, in response to the continuous activation of the BOS, the pseudo accelerator position keeps zero as it is at time t3, in spite of the operation state (the accelerator position APr1) of the accelerator pedal 21.

From time t3 to t5, the operation state of the brake pedal 25 still continues to be "with operation" (the brake torque=BK).

From time t3 to t5, the output state (the actual deceleration AC_rea) of the driving/braking force by the motor generator 49 still continues to be the reference deceleration AC_std.

Note that during the time period from time t3 to t5, in the comparative example in which the BOS control for limiting the decrease in the output state of the driving/braking force by the motor generator 49 to the level corresponding to the reference deceleration AC_std is not performed, the output state of the driving/braking force by the motor generator 49 keeps braking force (deceleration force) corresponding to a deceleration stage at which the braking force is excessively larger than the reference deceleration AC_std (the 4th stage).

From time t3 to t5, the output state of the acceleration/deceleration applied to the vehicle 10 keeps a value corresponding to the deceleration after the control by the BOS from time t1 to t2.

From time t5 to t7 illustrated in FIG. 4A, the operation state (the accelerator position) of the accelerator pedal 21 still continues to be the prescribed accelerator position APr1.

At time t5, the operation state of the brake pedal 25 is changed from "with operation" (the brake torque=BK) to "without operation" (the brake torque=zero). That is, at time t5, the simultaneous operation of the brake pedal 25 and the accelerator pedal 21 terminates. From time t5 to t7, the operation state of the brake pedal 25 continues to be "without operation" (the brake torque=zero).

Note that from time t5 to t7, however, the BOS continues to be activated.

From time t5 to t7, the pseudo accelerator position exhibits a linear gradual increase from zero to APr1, pursuant to the operation state (the accelerator position APr1) of the accelerator pedal 21. A change rate of the gradual increase of the pseudo accelerator position is set to, for example, a constant rate such as "APr1/2 seconds" in which the pseudo accelerator position linearly and gradually increases from zero to APr1 by a prescribed unit time.

In this embodiment, a time required for gradually increasing the pseudo accelerator position from time t5 to t7 is set to substantially twice as long as a time required for gradually decreasing the pseudo accelerator position from time t1 to t3.

From time t5 to t6 as a former half of a time period from time t5 to t7, the output state (the actual deceleration AC_rea) of the driving/braking force by the motor generator 49 maintains a level corresponding to the reference deceleration AC_std, though the pseudo accelerator position exhibits a linear gradual increase from zero to APr1. This means that when to increase the braking force (the deceleration) from the reference deceleration AC_std back to the original driving force AC4d (APr1) is delayed in response to the change to "without brake" (the brake torque=zero) at time t5.

Note that during the time period from time t5 to t6, in the comparative example in which the BOS control for limiting the decrease in the output state of the driving/braking force by the motor generator 49 to the level corresponding to the reference deceleration AC_std is not performed, the output state of the driving/braking force by the motor generator 49 exhibits a linear gradual increase from braking force (deceleration force) corresponding to a deceleration stage of interest (the 4th stage) to the reference deceleration AC_std, in accordance with the linear gradual increase of the pseudo accelerator position from zero to APr1.

From time t6 to t7 as a latter half of the time period from time t5 to t7, the output state (the actual deceleration AC_rea) of the driving/braking force by the motor generator 49 exhibits a linear gradual increase from the reference deceleration AC_std back to the original driving force AC4d (APr1), in accordance with the linear gradual increase of the pseudo accelerator position from zero to APr1.

Note that during the time period time t1 through t7, the required deceleration AC_dm continues to be different from the actual deceleration AC_rea (Required deceleration AC_dm>Actual deceleration AC_rea).

At time t5 during the time period from time t5 to t7, the output state of the acceleration/deceleration applied to the vehicle 10 exhibits a steep increase in an deceleration as large as that corresponding to the braking force (the acceleration force) from time t0 to t1, by an amount corresponding to the friction braking (the brake torque BK), in accordance with a steep decrease of the brake torque from BK to zero.

From time t5 to t6 as the former half of the time period from time t5 to t7, the output state of the acceleration/deceleration applied to the vehicle 10 maintains the deceleration increased by the friction braking (the brake torque BK), from the prescribed deceleration during the time period from time t2 to t5.

From time t6 to t7 as the latter half of the time period from time t5 to t7, the output state of the acceleration/deceleration applied to the vehicle 10 exhibits a linear gradual increase from the deceleration after the steep increase from time t5 to t6, back to a level corresponding to the original driving force AC4d (APr1), by the reduction by the BOS, in accordance with the linear gradual increase of the pseudo accelerator position from zero to APr1 from time t5 to t7.

<Case where Required Level (Required Deceleration) AC_dm is Smaller than Reference Deceleration AC_std>

Basic operations performed by the vehicle deceleration controller 11 are described in a case where a required level (a required deceleration) AC_dm based on a deceleration operation of the accelerator pedal 21 is smaller than the reference deceleration AC_std, with reference to FIG. 4B.

In FIG. 4B, from time t0 to t1, an operation state (an accelerator position) of the accelerator pedal 21 shows a prescribed accelerator position APr2 (wherein APr2<APr1). From time t0 to t1, an operation state (a brake torque) of the brake pedal 25 shows "without operation" (the brake torque=zero). An output state (an actual deceleration AC_rea) of driving/braking force by the motor generator 49 shows a value in accordance with the accelerator position APr2 (a value corresponding to "Required deceleration AC_dm=AC4d (APr2)"). An output state of an acceleration/deceleration applied to the vehicle 10 shows, similar to that of the driving/braking force, a value in accordance with the accelerator position APr2.

From time t1 to t3 in FIG. 4B, the operation state (the accelerator position) of the accelerator pedal 21 continues to be the prescribed accelerator position APr1.

At time t1, the operation state of the brake pedal 25 is changed from "without operation" (the brake torque=zero) to "with operation" (the brake torque=BK). That is, at time t1, the brake pedal 25 and the accelerator pedal 21 are operated simultaneously. As a result, the BOS (brake override system) is activated from time t1 as a starting point through time t7 illustrated in FIG. 4B.

From time t1 to t3, in response to the activation of the BOS, the pseudo accelerator position exhibits a linear gradual decrease from APr2 to zero, in spite of the operation state (the accelerator position APr2) of the accelerator pedal 21. A change rate of the gradual decrease of the pseudo accelerator position is the same as that in the example illustrated in FIG. 4A.

In the example illustrated in FIG. 4B, however, driving/braking control is performed in accordance with the required level (the required deceleration) "AC_dm=AC4d (APr2)" based on a deceleration operation (an accelerator position) of the accelerator pedal 21. In other words, driving/braking control in accordance with the pseudo accelerator position is not performed.

This is because the required level (the required deceleration) AC_dm based on the accelerator position is present nearer the deceleration side, compared to the reference deceleration AC_std (AC_dm−AC_std<0).

From time t1 to t3, the operation state of the brake pedal 25 continues to be "with operation" (the brake torque=BK).

From time t1 to t3, the output state (the actual deceleration AC_rea) of the driving/braking force by the motor generator 49 shows a braking force characteristic in accordance with the required level (the required deceleration) "AC_dm=AC4d (APr2)" based on the accelerator position.

From time t1 to t3, a braking force characteristic when driving/braking control is performed based on the pseudo accelerator position is indicated by a dotted line.

At time t1 during the time period from time t1 to t3, the output state of the acceleration/deceleration applied to the vehicle 10 exhibits a steep decrease in a deceleration as large as that corresponding to a required level (a required deceleration) based on the accelerator position APr2 from time t0 to t1, by an amount corresponding to friction braking (the brake torque BK), in accordance with a steep increase of the brake torque from zero to BK.

From time t1 to t3, the output state of the acceleration/deceleration applied to the vehicle 10 maintains the deceleration after the steep decrease at time t1 as large as that corresponding to the required level (the required deceleration) based on the accelerator position APr2, by the amount corresponding to the friction braking (the brake torque BK).

From time t3 to t5 illustrated in FIG. 4B, the operation state (the accelerator position) of the accelerator pedal 21 continues to be the prescribed accelerator position APr2. From time t3 to t5, the BOS continues to be activated.

From time t3 to t5, in response to the continuous activation of the BOS, the pseudo accelerator position keeps zero as it is at time t3, in spite of the operation state (the accelerator position APr2) of the accelerator pedal 21. In the example illustrated in FIG. 4B, however, the braking force control in accordance with the pseudo accelerator position is not performed as described above.

From time t3 to t5, the operation state of the brake pedal 25 still continues to be "with operation" (the brake torque=BK).

From time t3 to t5, the output state (the actual deceleration AC_rea) of the driving/braking force by the motor generator 49 shows a braking force characteristic in accordance with the required level (the required deceleration) "AC_dm=AC4d (APr2)" based on the accelerator position APr2.

The required level (the required deceleration) "AC_dm=AC4d (APr2)" based on the accelerator position APr2 is present, as illustrated in FIG. 4B, nearer the deceleration side, compared to the reference deceleration AC_std (AC_dm−AC_std<0).

From time t3 to t5, the output state of the acceleration/deceleration applied to the vehicle 10 keeps the deceleration after the steep decrease by the friction braking with respect to the required level (the required deceleration) based on the accelerator position APr2 at time t1.

From time t5 to t7 illustrated in FIG. 4B, the operation state (the accelerator position) of the accelerator pedal 21 still continues to be the prescribed accelerator position APr2.

At time t5, the operation state of the brake pedal 25 is changed from "with operation" (the brake torque=BK) to "without operation" (the brake torque=zero). That is, at time t5, the simultaneous operation of the brake pedal 25 and the accelerator pedal 21 terminates. From time t5 to t7, the operation state of the brake pedal 25 continues to be "without operation" (the brake torque=zero).

Note that from time t5 to t7, the BOS still continues to be activated.

From time t5 to t7, the pseudo accelerator position exhibits a linear gradual increase from zero to APr2, pursuant to the operation state (the accelerator position APr2) of the accelerator pedal 21. A change rate of the gradual increase of the pseudo accelerator position is the same as that of the example illustrated in FIG. 4A.

From time t5 to t7, the output state (the actual deceleration AC_rea) of the driving/braking force by the motor generator 49 maintains the braking force characteristic in accordance with the required level (the required deceleration) "AC_dm=AC4d (APr2)" based on the accelerator position APr2.

Note that from time t1 to t7, the required deceleration AC_dm is equal to the actual deceleration AC_rea (Required deceleration AC_dm=Actual deceleration AC_rea).

At time t5 during the time period from time t5 to t7, the output state of the acceleration/deceleration applied to the vehicle 10 exhibits a steep increase in a value of deceleration from time t0 to t5, by an amount corresponding to friction braking (the brake torque BK), in accordance with a steep decrease of the brake torque from BK to zero.

From time t5 to t7, the output state of the acceleration/deceleration applied to the vehicle 10 maintains the deceleration value increased by the friction braking (the brake torque BK), from the prescribed deceleration during the time period from time t1 to t5.

<<Operations of Vehicle Deceleration Controller 11 According to First Variation with Reference to Timing Diagram>>

Figure 5A:
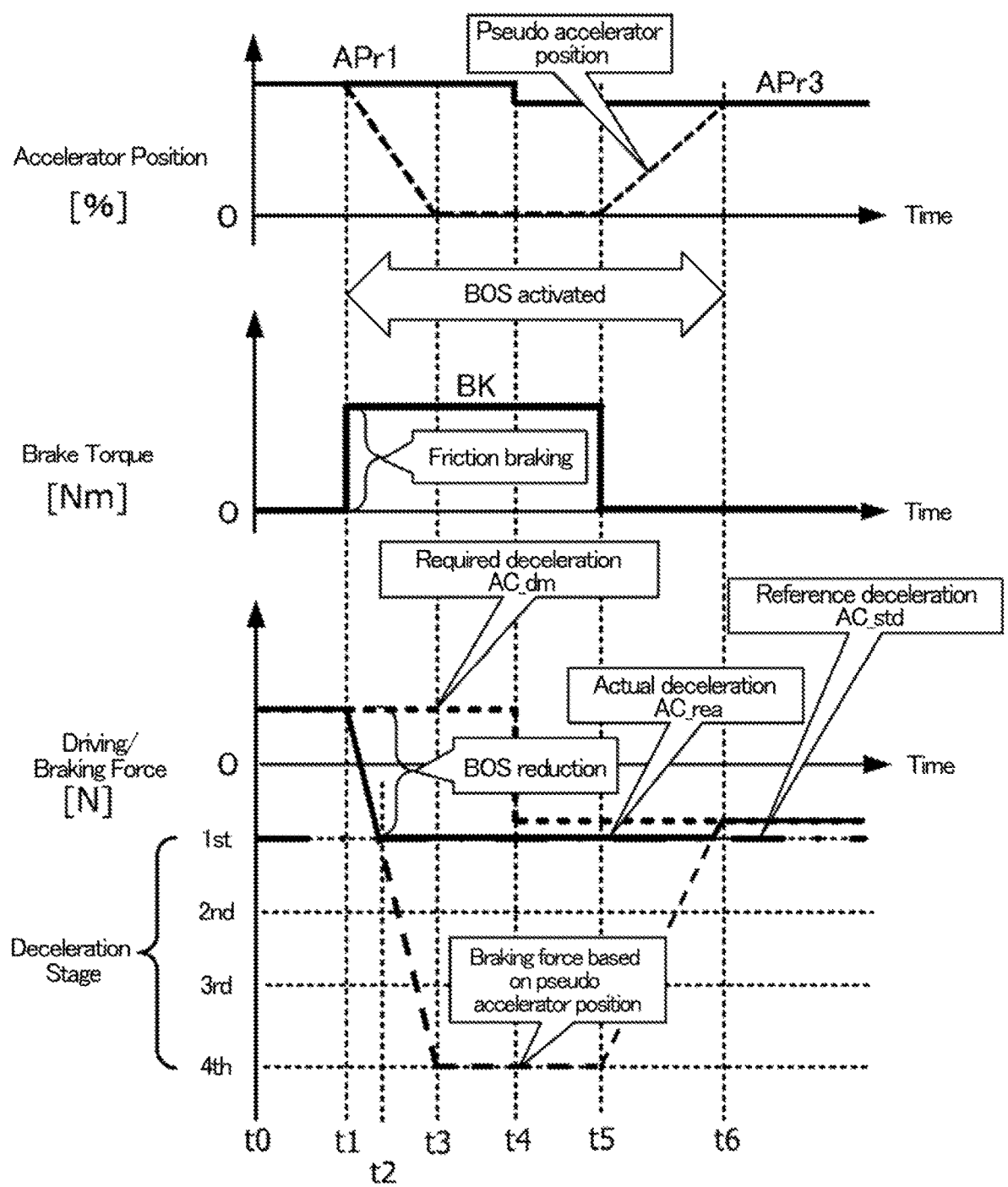
FIG. 5A is a timing diagram for explaining operations performed by the vehicle deceleration controller according to a first variation of the present invention.
Figure 5B:
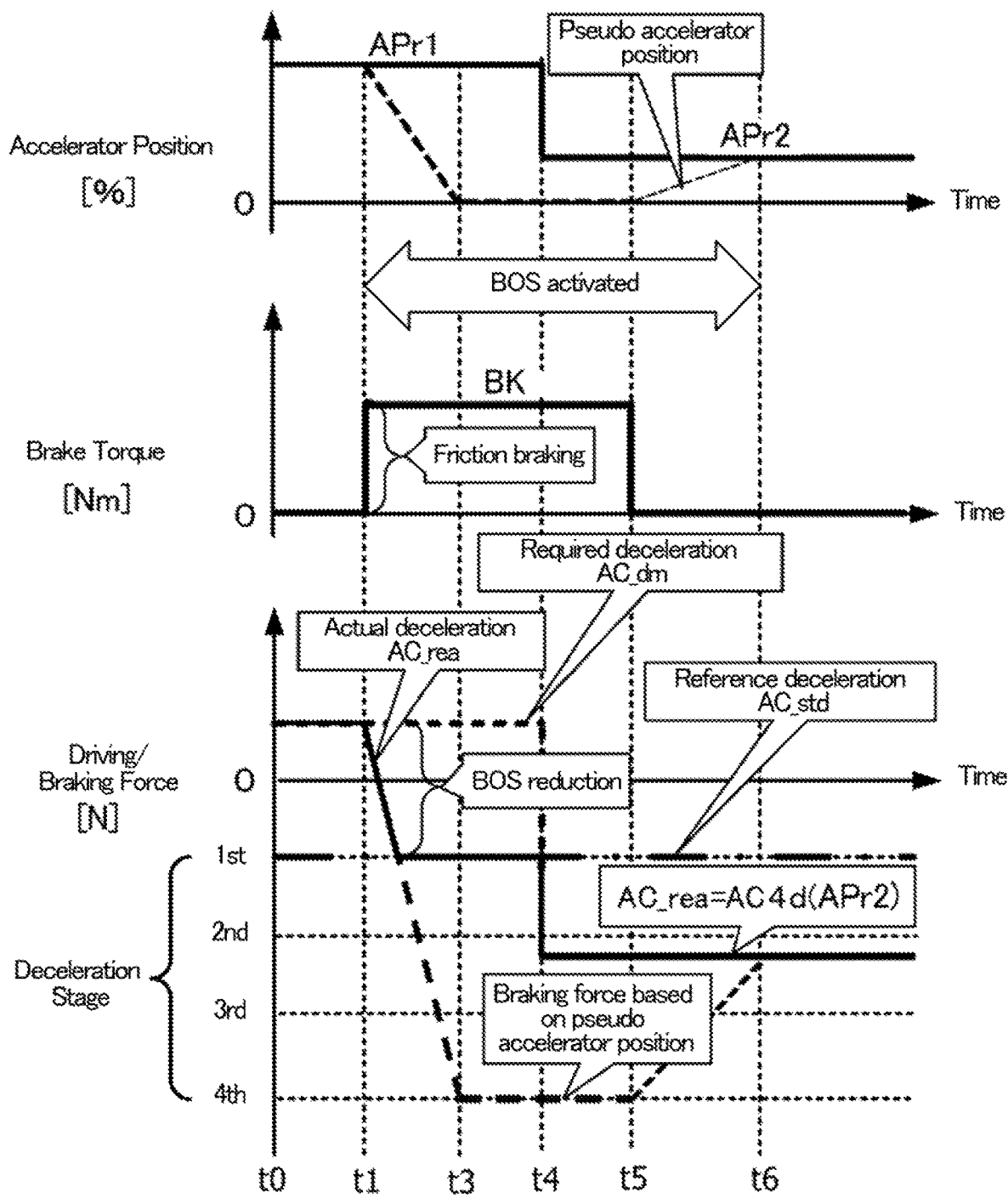
FIG. 5B is a timing diagram for explaining another operations performed by the vehicle deceleration controller according to the first variation.

Operations performed by the vehicle deceleration controller 11 according to a first variation of the embodiment of the present invention are described with reference to FIG. 5A and FIG. 5B, by taking two cases as examples, in each of which: the operation mode of the accelerator pedal 21 is the single pedal mode; the brake pedal 25 and the accelerator pedal 21 are operated simultaneously; and, when both of the former two conditions are satisfied, the required level (the required deceleration) AC_dm based on a deceleration operation of the accelerator pedal 21 shifts toward the deceleration side. In one of the two cases, an amplitude of the shift is relatively small, which is to be illustrated in FIG. 5A; and, in the other, large, which is to be described with reference to FIG. 5B. FIG. 5A and FIG. 5B are each a timing diagram for explaining the operations performed by the vehicle deceleration controller 11 according to the first variation of the present invention.

<Case where Amplitude of Shift in Required Level (Required Deceleration) AC_dm is Relatively Small>

Operations performed by the vehicle deceleration controller 11 are described with reference to FIG. 5A, when an amplitude of a shift in the required level (the required deceleration) AC_dm based on a deceleration operation of the accelerator pedal 21 is relatively small, according to the first variation.

The operations during a time period from time t0 to t3 performed by the vehicle deceleration controller 11 according to the first variation are the same as those of the basic operations performed by the vehicle deceleration controller 11 illustrated in FIG. 4A. Duplicate explanation is thus omitted herein and only operations at and after time t4 performed by the vehicle deceleration controller 11 according to the first variation are described below.

At time t4 illustrated in FIG. 5A, the operation state (the accelerator position) of the accelerator pedal 21 is changed from APr1 to APr3 (APr1>APr3). Thus, from time t4 to t5, the operation state (the accelerator position) of the accelerator pedal 21 is the accelerator position APr3. From time t4 to t5, the operation state of the brake pedal 25 continues to be "with operation" (the brake torque=BK).

Note that from time t1 to t6, the BOS continues to be activated.

At and after time t4, with the change of the accelerator position from APr1 to APr3 (wherein, APr1>APr3), the required level (the required deceleration) AC_dm based on the operation state (the accelerator position APr3) of the accelerator pedal 21 is also changed from AC4d (APr1) to AC4d (APr3) (wherein, AC4d (APr1)>AC4d (APr3)) toward the acceleration side.

From time t4 to t5, the output state (the actual deceleration AC_rea) of the driving/braking force by the motor generator 49 still continues to be the reference deceleration AC_std.

Note that during the time period from time t4 to t5, in the comparative example in which the BOS control for limiting a decrease in the output state of the driving/braking force by the motor generator 49 to a level corresponding to the reference deceleration AC_std is not performed, the output state of the driving/braking force by the motor generator 49 keeps braking force (deceleration force) corresponding to a deceleration stage at which the braking force is excessively larger than the reference deceleration AC_std (the 4th stage).

From time t5 to t6 illustrated in FIG. 5A, the operation state (the accelerator position) of the accelerator pedal 21 still continues to be the accelerator position APr3.

At time t5, the operation state of the brake pedal 25 is changed from "with operation" (the brake torque=BK) to "without operation" (the brake torque=zero). That is, at time t5, the simultaneous operation of the brake pedal 25 and the accelerator pedal 21 terminates. From time t5 to t6, the operation state of the brake pedal 25 continues to be "without operation" (the brake torque=zero).

Note that from time t5 to t6, the BOS still continues to be activated.

From time t5 to t6, the pseudo accelerator position exhibits a linear gradual increase from zero to APr3, pursuant to the operation state (the accelerator position APr3) of the accelerator pedal 21.

From time t5 to t6, the output state (the actual deceleration AC_rea) of the driving/braking force by the motor generator 49 substantially maintains a level corresponding to the reference deceleration AC_std, though the pseudo accelerator position exhibits a linear gradual increase from zero to APr1.

During a short time period immediately before time t6, however, the output state (the actual deceleration AC_rea) of the driving/braking force by the motor generator 49 exhibits a linear gradual increase from the reference deceleration AC_std back to the original driving force AC4d (APr3), in accordance with the linear gradual increase of the pseudo accelerator position from zero to APr3.

Note that during a time period from time t1 to t6, the required deceleration AC_dm continues to be different from the actual deceleration AC_rea (Required deceleration AC_dm>Actual deceleration AC_rea).

<Case where Amplitude of Shift in Required Level (Required Deceleration) AC_dm is Relatively Large>

Operations performed by the vehicle deceleration controller 11 are described with reference to FIG. 5B, when an amplitude of a shift in the required level (the required deceleration) AC_dm based on a deceleration operation of the accelerator pedal 21 is relatively large, according to the first variation.

The operations during a time period from time t0 to t3 performed by the vehicle deceleration controller 11 according to the first variation are the same as those of the basic operations performed by the vehicle deceleration controller 11 illustrated in FIG. 4B. Duplicate explanation is thus omitted herein and only operations at and after time t4 performed by the vehicle deceleration controller 11 according to the first variation are described below.

At time t4 illustrated in FIG. 5B, the operation state (the accelerator position) of the accelerator pedal 21 is changed from APr1 to APr2 (APr1>APr3>APr2). Thus, from time t4 to t5, the operation state (the accelerator position) of the accelerator pedal 21 is the accelerator position APr2. From time t4 to t5, the operation state of the brake pedal 25 continues to be "with operation" (the brake torque=BK).

Note that from time t1 to t6, the BOS still continues to be activated.

At and after time t4, with the change of the accelerator position from APr1 to APr2 (wherein, APr1>APr3>APr2), the required level (the required deceleration) AC_dm based on the operation state (the accelerator position APr2) of the accelerator pedal 21 is also changed from AC4d (APr1) to AC4d (APr2) (wherein, AC4d (APr1)>AC4d (APr2)) toward the acceleration side.

At and after time t4, the output state (the actual deceleration AC_rea) of the driving/braking force by the motor generator 49 is also changed from the reference deceleration AC_std to to AC4d (APr2).

This makes the required level (the required deceleration) "AC_dm=AC4d (APr2)" based on the deceleration operation (the accelerator position APr2) of the accelerator pedal 21 at and after time t4, present nearer the deceleration side, compared to the reference deceleration AC_std.

Thus, at and after time t4, the required level (the required deceleration) AC_dm based on the deceleration operation (the accelerator position APr2) of the accelerator pedal 21 is applied to as it is without limitation (AC_dm=AC4d (APr2)) (which may also be referred to as a fourth aspect of the present invention).

As a result, at and after time t4, the required deceleration "AC_dm=AC4d (APr2)" is equal to the actual deceleration "AC_rea=AC4d (APr2)" (Required deceleration AC_dm=Actual deceleration AC_rea).

From time t5 to t6 illustrated in FIG. 5B, the operation state (the accelerator position) of the accelerator pedal 21 still continues to be the accelerator position AP r2.

At time t5, the operation state of the brake pedal 25 is changed from "with operation" (the brake torque=BK) to "without operation" (the brake torque=zero). That is, at time t5, the simultaneous operation of the brake pedal 25 and the accelerator pedal 21 terminates. From time t5 to t6, the operation state of the brake pedal 25 continues to be "without operation" (the brake torque=zero).

Note that from time t5 to t6, the BOS still continues to be activated.

From time t5 to t6, the pseudo accelerator position exhibits a linear gradual increase from zero to APr2, pursuant to the operation state (the accelerator position APr2) of the accelerator pedal 21.

From time t5 to t6, the output state (the actual deceleration AC_rea) of the driving/braking force by the motor generator 49 still maintains a level corresponding to the reference deceleration AC_std, though the pseudo accelerator position exhibits a linear gradual increase from zero to APr2.

Note that during a time period from time t1 to t4 illustrated in FIG. 5B, the required deceleration AC_dm continues to be different from the actual deceleration AC_rea (Required deceleration AC_dm>Actual deceleration AC_rea).

In the meantime, after time t4, the required deceleration AC_dm is equal to the actual deceleration AC_rea (Required deceleration AC_dm=Actual deceleration AC_rea) regardless of whether or not the BOS is activated at that time.

<<Operations Performed by Vehicle Deceleration Controller 11 with Reference to Timing Diagram According to Second Variation>>

Figure 6A:
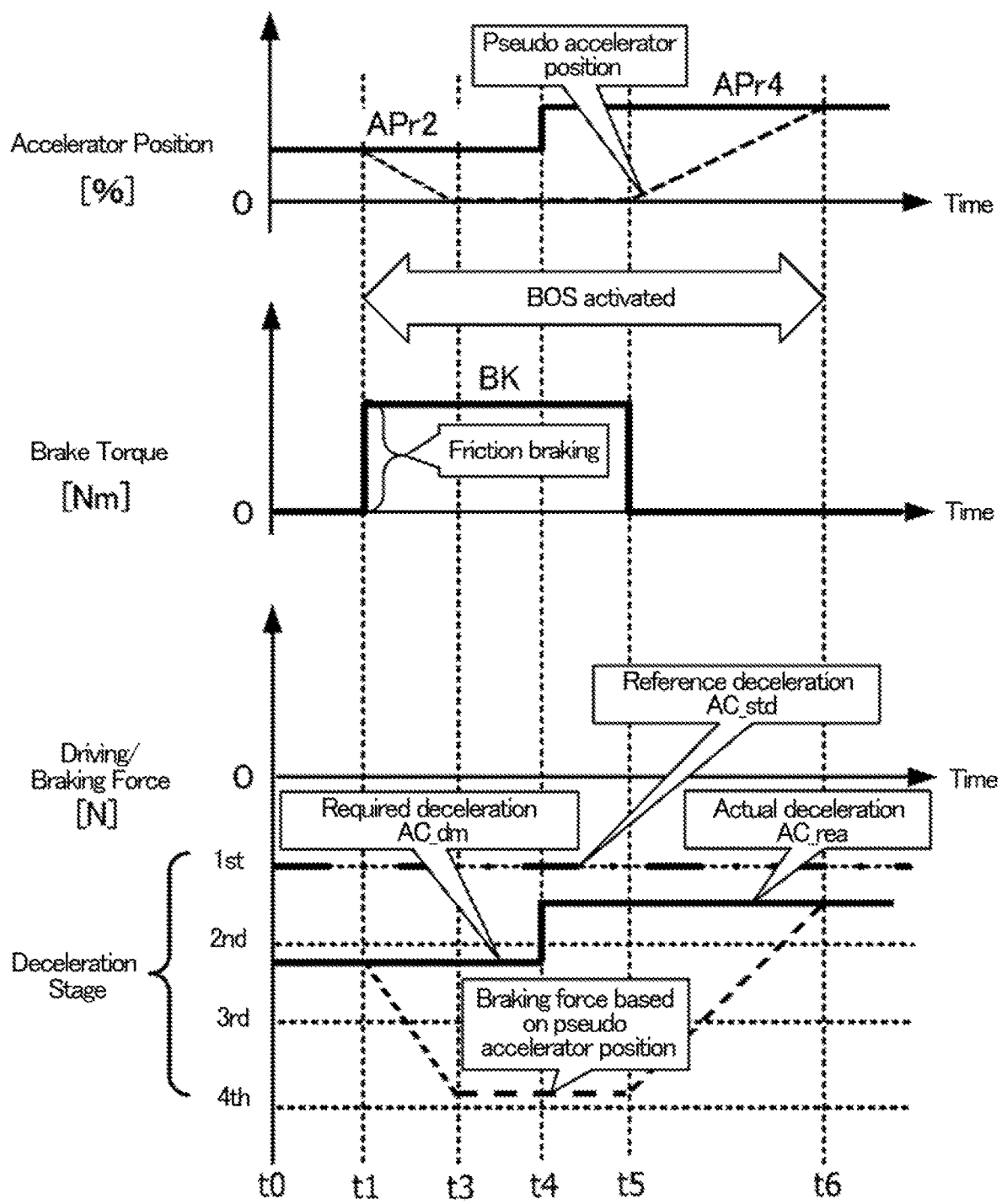
FIG. 6A is a timing diagram for explaining operations performed by the vehicle deceleration controller according to a second variation of the present invention.
Figure 6B:
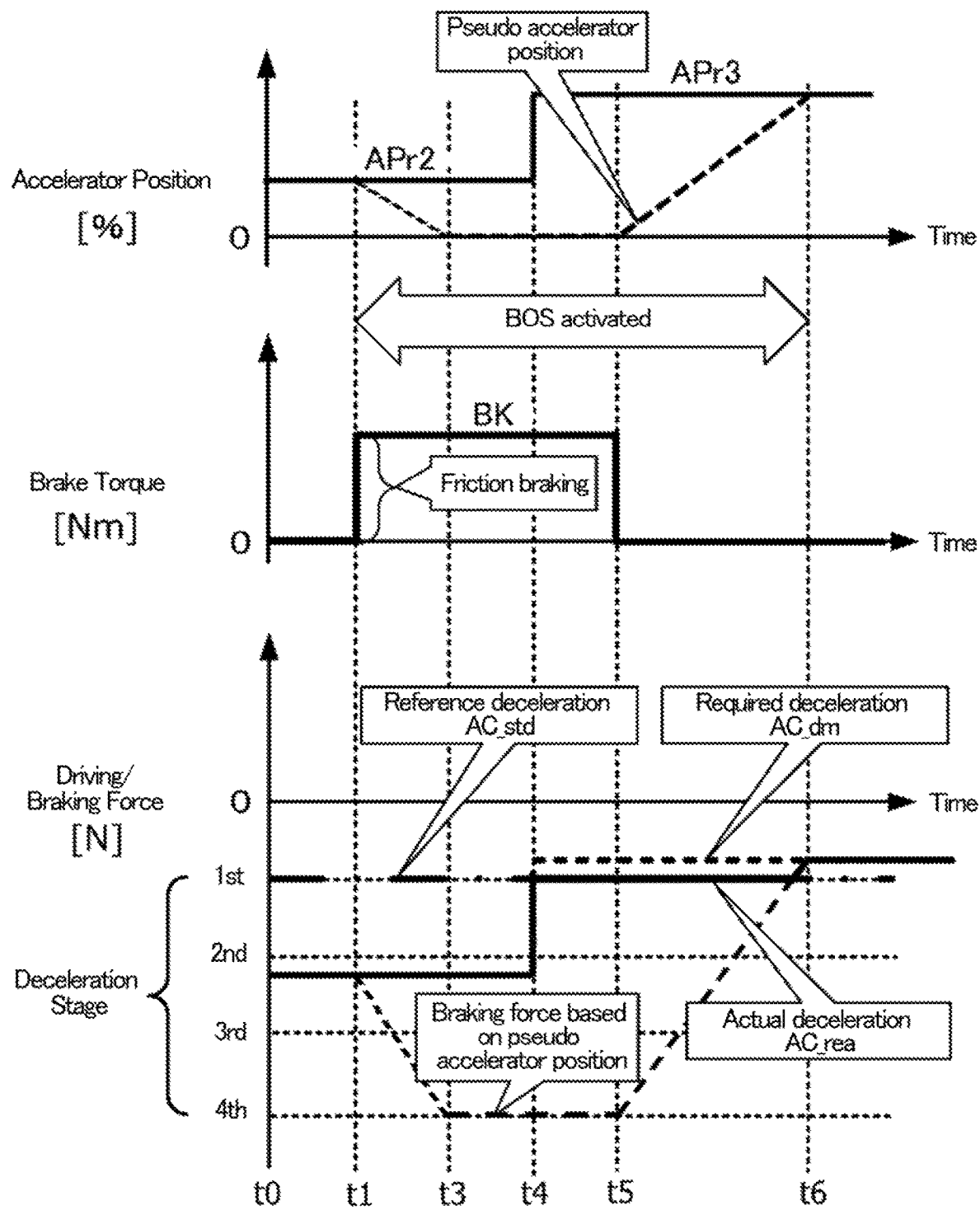
FIG. 6B is a timing diagram for explaining another operations performed by the vehicle deceleration controller according to the second variation.
Figure 6C:
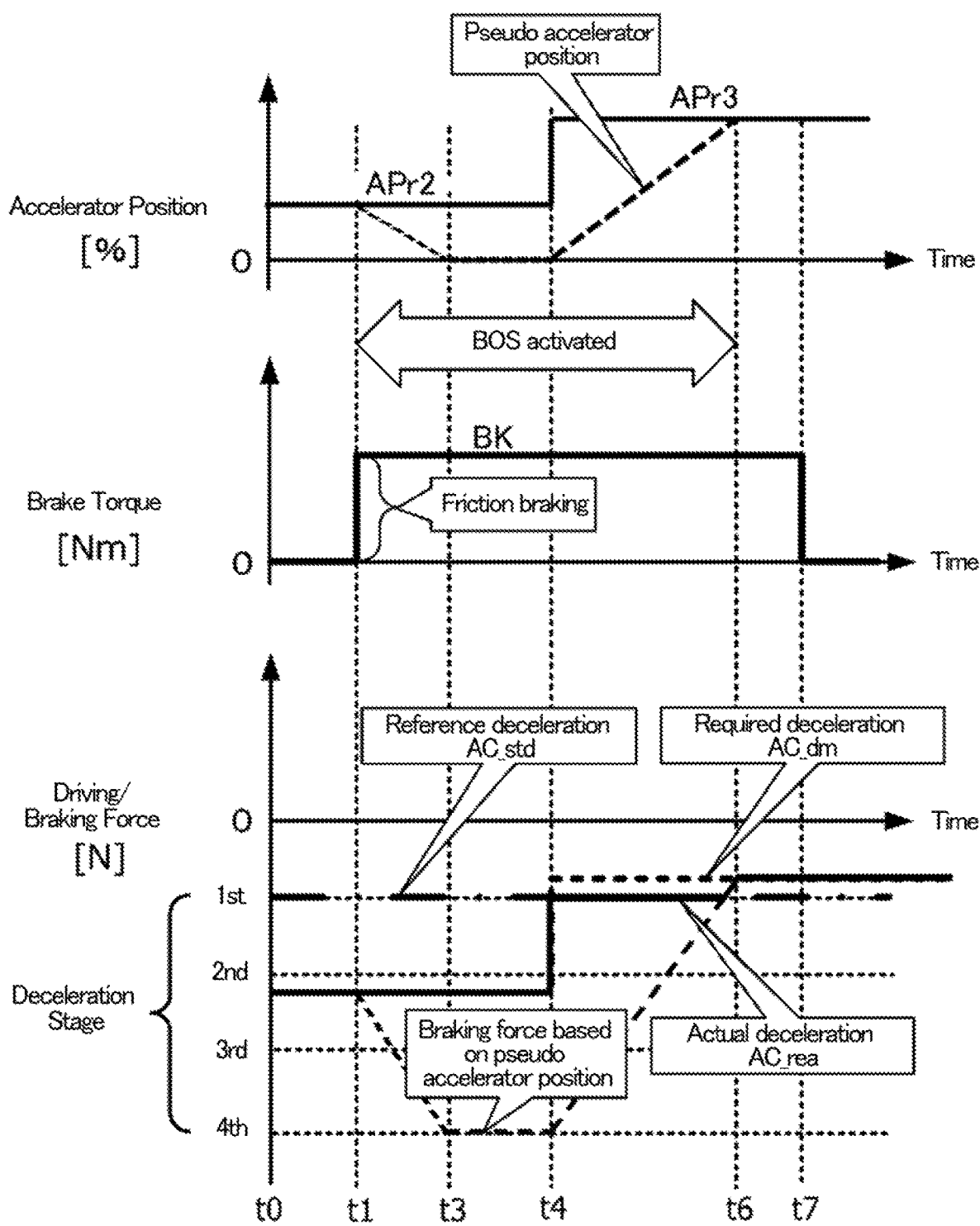
FIG. 6C is a timing diagram for explaining operations performed by the vehicle deceleration controller according to a variation of the second variation.

Operations performed by the vehicle deceleration controller 11 are described with reference to FIG. 6A to FIG. 6C according to a second variation of the embodiment of the present invention, by taking two cases as examples, in each of which: the operation mode of the accelerator pedal 21 is the single pedal mode; the brake pedal 25 and the accelerator pedal 21 are operated simultaneously; and, when both of the former two conditions are satisfied, the required level (the required deceleration) AC_dm based on the deceleration operation of the accelerator pedal 21 shifts toward the acceleration side. In one of the two cases, an amplitude of the shift is relatively small, which is to be described with reference to FIG. 6A; and, in the other, large, which is to be described with reference to FIG. 6B. FIG. 6A and FIG. 6B are each a timing diagram for explaining the operations performed by the vehicle deceleration controller 11 according to the second variation of the present invention. In the meantime, FIG. 6C is a timing diagram for explaining operations performed by the vehicle deceleration controller 11 according to a variation of the second variation.

<Case where Amplitude of Shift in Required Level (Required Deceleration) AC_dm is Relatively Small>

Operations performed by the vehicle deceleration controller 11 are described with reference to FIG. 6A, when an amplitude of a shift in the required level (the required deceleration) AC_dm based on a deceleration operation of the accelerator pedal 21 is relatively small, according to the second variation.

In FIG. 6A, from time t0 to t1, an operation state (an accelerator position) of the accelerator pedal 21 shows the prescribed accelerator position APr2 (wherein APr2<APr1). From time t0 to t1, an operation state (a brake torque) of the brake pedal 25 shows "without operation" (the brake torque=zero). An output state (an actual deceleration AC_rea) of driving/braking force by the motor generator 49 shows a value in accordance with the accelerator position APr2 (a value corresponding to the required acceleration/deceleration: AC4d (APr2)").

From time t1 to t3 in FIG. 6A, the operation state (the accelerator position) of the accelerator pedal 21 continues to be the prescribed accelerator position APr2.

At time t1, the operation state of the brake pedal 25 is changed from "without operation" (the brake torque=zero) to "with operation" (the brake torque=BK). That is, at time t1, the brake pedal 25 and the accelerator pedal 21 are operated simultaneously. As a result, the BOS (brake override system) is activated from time t1 as a starting point through time t6 illustrated in FIG. 6A.

From time t1 to t3, in response to the activation of the BOS, the pseudo accelerator position exhibits a linear gradual decrease from APr2 to zero, in spite of the operation state (the accelerator position APr2) of the accelerator pedal 21. A change rate of the gradual decrease of the pseudo accelerator position is the same as that in the example illustrated in FIG. 4A.

In the example illustrated in FIG. 6A, however, driving/braking control is performed in accordance with the required level (the required deceleration) "AC_dm=AC4d (APr2)" based on the deceleration operation (the accelerator position) of the accelerator pedal 21. In other words, the driving/braking control in accordance with the pseudo accelerator position is not performed.

This is because the required level (the required deceleration) "AC_dm=AC4d (APr2)" based on the accelerator position APr2 is, as illustrated in FIG. 6A, present nearer the deceleration side, compared to the reference deceleration AC_std (AC_dm−AC_std<0).

From time t1 to t3, the operation state of the brake pedal 25 continues to be "with operation" (the brake torque=BK).

From time t1 to t3, the output state (the actual deceleration AC_rea) of the driving/braking force by the motor generator 49 shows a braking force characteristic in accordance with the required level (the required deceleration) "AC_dm=AC4d (APr2)" based on the accelerator position.

From time t1 to t3, a braking force characteristic when the driving/braking control is performed based on the pseudo accelerator position is indicated by a dotted line.

From time t3 to t4 illustrated in FIG. 6A, the operation state (the accelerator position) of the accelerator pedal 21 continues to be the prescribed accelerator position APr2. From time t3 to t4, the BOS still continues to be activated.

From time t3 to t4, in response to the continuous activation of the BOS, the pseudo accelerator position keeps zero as it is at time t3, in spite of the operation state (the accelerator position APr2) of the accelerator pedal 21. In the example illustrated in FIG. 6A, however, the braking force control in accordance with the pseudo accelerator position is not performed as described above.

From time t3 to t4, the operation state of the brake pedal 25 continues to be "with operation" (the brake torque=BK).

From time t3 to t4, the output state (the actual deceleration AC_rea) of the driving/braking force by the motor generator 49 shows a braking force characteristic in accordance with the required level (the required deceleration) "AC_dm=AC4d (APr2)" based on the accelerator position APr2.

The required level (the required deceleration) "AC_dm=AC4d (APr2)" based on the accelerator position APr2 is, as illustrated in FIG. 6A, present nearer the deceleration side, compared to the reference deceleration AC_std (AC_dm−AC_std<0).

At time t4 illustrated in FIG. 6A, the operation state (the accelerator position) of the accelerator pedal 21 is changed from APr2 to APr4 (APr2<APr4). Thus, from time t4 to t5, the operation state (the accelerator position) of the accelerator pedal 21 is the accelerator position APr2. From time t4 to t5, the operation state of the brake pedal 25 continues to be "with operation" (the brake torque=BK).

Note that from time t1 to t6, the BOS still continues to be activated.

At and after time t4, with the change of the accelerator position from APr2 to APr4 (wherein, APr2<APr4), the required level (the required deceleration) AC_dm based on the operation state (the accelerator position APr4) of the accelerator pedal 21 is also changed from AC4d (APr2) to AC4d (APr4) (wherein, AC4d (APr2)<AC4d (APr4)) toward the deceleration side.

At and after time t4, the output state (the actual deceleration AC_rea) of the driving/braking force by the motor generator 49 is also changed from AC4d (APr2) to AC4d (APr4).

This is because, as illustrated in FIG. 6A, the required level (the required deceleration) "AC_dm=AC4d (APr4)" based on the accelerator position APr4 is present nearer the deceleration side, compared to the reference deceleration AC_std (AC_dm−AC_std<0), similarly to the required level (required deceleration) "AC_dm=AC4d (APr2)" based on the accelerator position APr2.

From time t5 to t6 illustrated in FIG. 6A, the operation state (the accelerator position) of the accelerator pedal 21 continues to be the accelerator position APr4.

At time t5, the operation state of the brake pedal 25 is changed from "with operation" (the brake torque=BK) to "without operation" (the brake torque=zero). That is, at time t5, the simultaneous operation of the brake pedal 25 and the accelerator pedal 21 terminates. From time t5 to t6, the operation state of the brake pedal 25 continues to be "without operation" (the brake torque=zero).

Note that from time t5 to t6, the BOS still continues to be activated.

From time t5 to t6, the pseudo accelerator position exhibits a linear gradual increase from zero to APr4, pursuant to the operation state (the accelerator position APr4) of the accelerator pedal 21.

From time t5 to t6, the output state (the actual deceleration AC_rea) of the driving/braking force by the motor generator 49 still maintains a level corresponding to the required level (the required deceleration) "AC_dm=AC4d (APr4)" based on the deceleration operation (the accelerator position APr4) of the accelerator pedal 21, though the pseudo accelerator position exhibits a linear gradual increase from zero to APr4.

Note that, from time t0 to t6, the required deceleration AC_dm is equal to the actual deceleration AC_rea (Required deceleration AC_dm=Actual deceleration AC_rea).

<Case where Amplitude of Shift in Required Level (Required Deceleration) AC_dm is Relatively Large>

Operations performed by the vehicle deceleration controller 11 are described with reference to FIG. 6B, when an amplitude of a shift in the required level (the required deceleration) AC_dm based on a deceleration operation of the accelerator pedal 21 is relatively large, according to the second variation.

Note that the operations during a time period from time t0 to t3 performed by the vehicle deceleration controller 11 in the case where the amplitude of the shift in the required level (the required deceleration) AC_dm is relatively large according to the second variation are the same as those in the case where the amplitude of the shift in the required level (the required deceleration) AC_dm is relatively small according to the second variation illustrated in FIG. 6A. Duplicate explanation is thus omitted herein and operations performed by the vehicle deceleration controller 11 only at and after time t4 in the case where the amplitude of the shift in the required level (the required deceleration) AC_dm is relatively large according to the second variation are described below.

At time t4 illustrated in FIG. 6B, the operation state (the accelerator position) of the accelerator pedal 21 is changed from APr2 to APr3 (APr2<APr3). Thus, from time t4 to t5, the operation state (the accelerator position) of the accelerator pedal 21 is the accelerator position APr3. From time t4 to t5, the operation state of the brake pedal 25 continues to be "with operation" (the brake torque=BK).

Note that from time t1 to t6, the BOS continues to be activated.

At and after time t4, with the change of the accelerator position from APr2 to APr3 (wherein, APr2<APr3), the required level (the required deceleration) AC_dm based on the operation state (the accelerator position APr3) of the accelerator pedal 21 is also changed from AC4d (APr2) to AC4d (APr3) (wherein, AC4d (APr2)<AC4d (APr3)) toward the acceleration side.

At and after time t4, the output state (the actual deceleration AC_rea) of the driving/braking force by the motor generator 49 is changed from AC4d (APr2) to a level corresponding to the reference deceleration AC_std.

This is because the required level (the required deceleration) "AC_dm=AC4d (APr3)" based on the accelerator position APr3 is, as illustrated in FIG. 6B, present slightly nearer the acceleration side, compared to the reference deceleration AC_std (AC_dm−AC_std<0).

From time t5 to t6 illustrated in FIG. 6B, the operation state (the accelerator position) of the accelerator pedal 21 still continues to be the accelerator position APr3.

At time t5, the operation state of the brake pedal 25 is changed from "with operation" (the brake torque=BK) to "without operation" (the brake torque=zero). That is, at time t5, the simultaneous operation of the brake pedal 25 and the accelerator pedal 21 terminates. From time t5 to t6, the operation state of the brake pedal 25 continues to be "without operation" (the brake torque=zero).

Note that from time t5 to t6, the BOS still continues to be activated.

From time t5 to t6, the pseudo accelerator position exhibits a linear gradual increase from zero to APr3, pursuant to the operation state (the accelerator position APr3) of the accelerator pedal 21.

From time t5 to t6, the output state (the actual deceleration AC_rea) of the driving/braking force by the motor generator 49 is limited to the reference deceleration AC_std, without achieving the required level (the required deceleration) "AC_dm=AC4d (APr3)" based on the deceleration operation (the accelerator position APr3) of the accelerator pedal 21, though the pseudo accelerator position exhibits a linear gradual increase from zero to APr3.

This is because, from time t4 to t6, the required level (the required deceleration) "AC_dm=AC4d (APr3)" based on the deceleration operation (the accelerator position APr3) of the accelerator pedal 21 is present nearer the acceleration side, compared to the reference deceleration AC_std.

That is, from time t1 to t4 illustrated in FIG. 6B, the required deceleration AC_dm is equal to the actual deceleration AC_rea (Required deceleration AC_dm=Actual deceleration AC_rea).

Meanwhile, after time t4, the required deceleration AC_dm is different from the actual deceleration AC_rea (Required deceleration AC_dm>Actual deceleration AC_rea).

During a short time period immediately before time t6, however, the output state (the actual deceleration AC_rea) of the driving/braking force by the motor generator 49 exhibits a linear gradual increase from the reference deceleration AC_std back to the original driving force AC4d (APr3), in accordance with the linear gradual increase of the pseudo accelerator position from zero to APr3.

<Another Case where Amplitude of Shift in Required Level (Required Deceleration) AC_dm is Relatively Large>

Operations performed by the vehicle deceleration controller 11 are described with reference to FIG. 6C, according to a variation of the second variation.

The operations performed by the vehicle deceleration controller 11 according to the variation of the second variation have much substantially in common with those according to the second variation illustrated in FIG. 6B.

Description herein is thus made focusing on operations according to the variation of the second variation different from those according to the second variation.

In the second variation illustrated in FIG. 6B, from time t5 to t6, triggered by the termination of the simultaneous operation of the brake pedal 25 and the accelerator pedal 21 at time t5, the pseudo accelerator position exhibits a linear gradual increase from zero to APr3, pursuant to the operation state (the accelerator position APr3) of the accelerator pedal 21.

The pseudo accelerator position is referenced when an end time of the BOS activation is determined. In the second variation illustrated in FIG. 6B, the end time of the BOS activation is determined to be time t6 at which the pseudo accelerator position reaches APr3.

Meanwhile, in the variation of the second variation illustrated in FIG. 6C, from time t4 to t6, triggered by a change in the operation state (the accelerator position) of the accelerator pedal 21 from APr2 to APr3 (APr2<APr3) at time t4, the pseudo accelerator position exhibits a linear gradual increase from zero to APr3, pursuant to the operation state (the accelerator position APr3) of the accelerator pedal 21.

In the variation of the second variation illustrated in FIG. 6C, the end point of the BOS activation is at time t6 at which the pseudo accelerator position reaches APr3, similarly to the second variation illustrated in FIG. 6B.

The variation of the second variation illustrated in FIG. 6C is, however, different from the second variation illustrated in FIG. 6B in that, from time t6 to t7, the end point of the BOS activation is time t6 at which the pseudo accelerator position reaches APr3, though the operation state of the brake pedal 25 maintains "with operation" (the brake torque=BK).

That is, the variation of the second variation illustrated in FIG. 6C is different from the second variation illustrated in FIG. 6B in a case as follows. In the variation of the second variation illustrated in FIG. 6C, the BOS (brake override system) is stopped with or without an operation of the brake pedal 25, when an operation state (an accelerator position) of the accelerator pedal 21 is changed from APr2 to APr3 (APr2<APr3), in other words, when the required level (the required deceleration) "AC_dm=AC4d (APr3)" based on the operation state (the accelerator position APr3) of the accelerator pedal 21 after the change exceeds the reference deceleration AC_std.

<<Advantageous Effects of Vehicle Deceleration Controller 11 According to Embodiments>>

Advantageous effects of the vehicle deceleration controller 11 according to the embodiments of the present invention are described below.

In a first aspect of the present invention, the vehicle deceleration controller 11 includes: the brake pedal 25 (a brake operator) that is operated when a brake request of a vehicle 10 is inputted; the accelerator pedal 21 (an acceleration/deceleration operator) that is operated when an acceleration/deceleration request of the vehicle 10 is inputted; the target acceleration/deceleration setting part 71 (a target deceleration setting part) configured to, when the accelerator pedal 21 is operated to decelerate the vehicle 10, set a target deceleration based on the deceleration operation; and the acceleration/deceleration control part 73 (a deceleration control part) configured to, when the accelerator pedal 21 is operated to decelerate the vehicle 10, provide deceleration control over the vehicle 10, such that the actual deceleration AC_rea follows the target deceleration set by the target acceleration/deceleration setting part 71. In a case where the brake pedal 25 and the accelerator pedal 21 are operated simultaneously, the acceleration/deceleration control part 73 is configured to, when a value at a required level based on the deceleration operation is present nearer the acceleration side, compared to the previously-set reference deceleration AC_std, then provide deceleration control over the vehicle 10, such that the actual deceleration AC_rea follows the reference deceleration AC_std.

In the first aspect, in the vehicle deceleration controller 11, in the case where: the operation mode of the accelerator pedal 21 is the single pedal mode; and the brake pedal 25 and the accelerator pedal 21 are operated simultaneously, the acceleration/deceleration control part 73 is configured to, when the value at the required level based on the deceleration operation of the accelerator pedal 21 is present nearer the acceleration side, compared to the previously-set reference deceleration AC_std, then provide deceleration control over the vehicle 10, such that the actual deceleration AC_rea follows the reference deceleration AC_std.

The terms "the case where: the operation mode of the accelerator pedal 21 is the single pedal mode; the brake pedal 25 and the accelerator pedal 21 are operated simultaneously; and the value at the required level based on the deceleration operation of the accelerator pedal 21 is present nearer the acceleration side, compared to the previously-set reference deceleration AC_std used herein assume a scene in which, for example, a driver: is driving the vehicle 10 with depression of the accelerator pedal 21 in the single pedal mode; and, when taking a corner, driving through an intersection, or the like, desires to slightly decelerate the vehicle 10.

In the scene as described above, it is required that the deceleration desired by the driver can be obtained in an amount approximately the same as that obtained by the existent BOS, while avoiding a sudden deceleration which may give the driver an uncomfortable feeling.

The reference deceleration AC_std used herein means, in the scene as described above, a value of deceleration determined such that a difference between the required level AC_dm based on the deceleration operation of the accelerator pedal 21 and the actual deceleration AC_rea falls within a prescribed tolerable range.

In the first aspect, in the vehicle deceleration controller 11 in the scene as described above, the deceleration control over the vehicle 10 is provided such that the actual deceleration AC_rea follows the reference deceleration AC_std. This makes it possible to, even when the acceleration/deceleration operator in the single pedal mode and the brake operator are operated simultaneously: realize a natural deceleration feeling which does not give a driver an uncomfortable feeling; and ensure deceleration approximately the same as that obtained by the existent BOS.

In a second aspect of the present invention, in the vehicle deceleration controller 11 according to the first aspect, in the case where: the operation mode of the accelerator pedal 21 is the single pedal mode; and the brake pedal 25 and the accelerator pedal 21 are operated simultaneously, the acceleration/deceleration control part 73 (the deceleration control part) is configured to, when a value at a required level based on a deceleration operation is present nearer the deceleration side, compared to the reference deceleration AC_std, then provide deceleration control over the vehicle 10, such that the actual deceleration AC_rea follows the required deceleration AC_dm based on the operations of the brake pedal 25 and the accelerator pedal 21.

In the second aspect, in the vehicle deceleration controller 11 in the case where: the operation mode of the accelerator pedal 21 is the single pedal mode; and the brake pedal 25 and the accelerator pedal 21 are operated simultaneously, the acceleration/deceleration control part 73 is configured to, when the value at the required level based on the based on the deceleration operation of the accelerator pedal 21 is present nearer the deceleration side, compared to the reference deceleration AC_std, then provide deceleration control over the vehicle 10, such that the actual deceleration AC_rea follows the required deceleration AC_dm based on the operations of the brake pedal 25 and the accelerator pedal 21.

The terms "the case where: the operation mode of the accelerator pedal 21 is the single pedal mode; the brake pedal 25 and the accelerator pedal 21 are operated simultaneously; and the value at the required level based on the deceleration operation of the accelerator pedal 21 is present nearer the deceleration side, compared to the reference deceleration AC_std" used herein assume a scene in which, for example, a driver: is slowly driving the vehicle 10 with a light depression of the accelerator pedal 21 in the single pedal mode; and, when, for example, taking a corner, driving through an intersection, or the like, desires to slightly decelerate the vehicle 10.

In the scene described above, a further increase in the deceleration is not necessary, because the driver himself/herself intends to decelerate the vehicle 10 by the deceleration operation of the accelerator pedal 21.

The acceleration/deceleration control part 73 thus provides deceleration control over the vehicle 10, such that the actual deceleration AC_rea follows the required deceleration AC_dm based on the operations of the brake pedal 25 and the accelerator pedal 21.

In the second aspect, in the vehicle deceleration controller 11 in the case where: the operation mode of the accelerator pedal 21 is the single pedal mode; the brake pedal 25 and the accelerator pedal 21 are operated simultaneously; and the required level based on the deceleration operation of the accelerator pedal 21 is present nearer the deceleration side, compared to the reference deceleration AC_std, the acceleration/deceleration control part 73 is configured to provide deceleration control over the vehicle 10, such that the actual deceleration AC_rea follows the required deceleration AC_dm based on the operations of the brake pedal 25 and the accelerator pedal 21. This makes it possible to, in addition to the advantageous effects of the vehicle deceleration controller 11 in the first aspect, provide control over behavior of the vehicle 10 in accordance with a driver's intention thereof. Thus, an advantageous effect of encouraging the driver to further enjoy driving fun can be expected.

In a third aspect, in the vehicle deceleration controller 11 according to the first or the second vehicle deceleration controller 11, the target deceleration is set to fall within a prescribed deceleration adjustable range previously-set in the vehicle 10; and the reference deceleration AC_std is set to a value having the smallest deceleration in the deceleration adjustable range.

In the third aspect, in the vehicle deceleration controller 11, the terms "the reference deceleration AC_std is set to the value having the smallest deceleration in the deceleration adjustable range" used herein means, more specifically, in a case, for example, where the deceleration adjustable range is set to the 1st to the 4th stage in ascending order, that the reference deceleration AC_std is set to the "1st stage", which corresponds to the smallest deceleration value in the deceleration adjustable range.

In the third aspect, in the vehicle deceleration controller 11, the reference deceleration AC_std is set to the value having the smallest deceleration in the deceleration adjustable range. This makes it possible to, even when the acceleration/deceleration operator in the single pedal mode and the brake operator are operated simultaneously: realize a natural deceleration feeling which does not give a driver an uncomfortable feeling; and further ensure deceleration approximately as much as that obtained by the existent BOS.

In a fourth aspect, in the vehicle deceleration controller 11 according to the first aspect, during the deceleration control over the vehicle 10 such that the actual deceleration AC_rea follows the reference deceleration AC_std, when the required level based on the deceleration operation of the accelerator pedal 21 shifts toward the deceleration side, compared to the reference deceleration AC_std, the acceleration/deceleration control part 73 (the deceleration control part) is configured to provide deceleration control over the vehicle 10 such that the actual deceleration AC_rea follows the required deceleration AC_dm based on the operations of the brake pedal 25 and the accelerator pedal 21.

In the fourth aspect, in the vehicle deceleration controller 11, in a case where, during the deceleration control over the vehicle 10 such that the actual deceleration AC_rea follows the reference deceleration AC_std, the required level based on the deceleration operation of the accelerator pedal 21 shifts toward the deceleration side, compared to the reference deceleration AC_std, then the acceleration/deceleration control part 73 (the deceleration control part) is configured to provide the deceleration control over the vehicle 10 such that the actual deceleration AC_rea follows the required deceleration AC_dm based on the operations of the brake pedal 25 and the accelerator pedal 21.

The terms "the case where during the deceleration control over the vehicle 10 such that the actual deceleration AC_rea follows the reference deceleration AC_std, the required level based on the deceleration operation of the accelerator pedal 21 shifts toward the deceleration side, compared to the reference deceleration AC_std, used herein assume a scene in which, for example, a driver: is accelerating the vehicle 10 with depression of the accelerator pedal 21 in the single pedal mode; and, when, for example, taking a corner, driving through an intersection, or the like, desires to quickly decelerate the vehicle 10.

In the scene as described above, it is required to ensure a deceleration in an amount in accordance with a driver's intention (a quick deceleration).

In the fourth aspect, in the vehicle deceleration controller 11 in the case where, during the deceleration control over the vehicle 10 such that the actual deceleration AC_rea follows the reference deceleration AC_std, the required level based on the deceleration operation of the accelerator pedal 21 shifts toward the deceleration side, compared to the reference deceleration AC_std, then the acceleration/deceleration control part 73 (the deceleration control part) is configured to provide the deceleration control over the vehicle 10 such that the actual deceleration AC_rea follows the required deceleration AC_dm based on the operations of the brake pedal 25 and the accelerator pedal 21. This makes it possible to ensure a deceleration in an amount in accordance with a driver's intention (the quick deceleration). Thus, an advantageous effect of encouraging the driver to further enjoy driving fun can be expected.

In a fifth aspect, in the vehicle deceleration controller 11 according to the second aspect, in a case where, during the deceleration control over the vehicle 10 such that the actual deceleration AC_rea follows the reference deceleration AC_std, the required level based on a deceleration operation of the accelerator pedal 21 shifts toward the acceleration side, compared to the reference deceleration AC_std, then the acceleration/deceleration control part 73 (the deceleration control part) is configured to provide the deceleration control over the vehicle 10 such that the actual deceleration AC_rea follows the reference deceleration AC_std.

In the fifth aspect, in the vehicle deceleration controller 11 in the case where, during the deceleration control over the vehicle 10 such that the actual deceleration AC_rea follows the reference deceleration AC_std, when the required level based on the deceleration operation of the accelerator pedal 21 shifts toward the acceleration side, compared to the reference deceleration AC_std, then the acceleration/deceleration control part 73 (the deceleration control part) is configured to provide the deceleration control over the vehicle 10 such that the actual deceleration AC_rea follows the reference deceleration AC_std.

The terms "the case where, during the deceleration control over the vehicle 10 such that the actual deceleration AC_rea follows the reference deceleration AC_std, the required level based on the deceleration operation of the accelerator pedal 21 shifts toward the acceleration side, compared to the reference deceleration AC_std used herein assume a scene in which, for example, a driver: is slowly driving the vehicle 10 with a light depression of the accelerator pedal 21 in the single pedal mode; and, when, for example, driving through a corner, an intersection, or the like, desires to accelerate the vehicle 10 again.

In the scene as described above, it is required that, on a basis of a driver's intention (re-acceleration), an assist control be provided in which an acceleration level of the vehicle 10 is shifted stage by stage to achieve an appropriate one.

In the fifth aspect, in the vehicle deceleration controller 11, during the deceleration control over the vehicle 10 such that the actual deceleration AC_rea follows the reference deceleration AC_std, when the required level based on the deceleration operation of the accelerator pedal 21 shifts toward the acceleration side, compared to the reference deceleration AC_std, then the acceleration/deceleration control part 73 (the deceleration control part) is configured to provide the deceleration control over the vehicle 10 such that the actual deceleration AC_rea follows the reference deceleration AC_std. This makes it possible to, on a basis of a driver's intention (re-acceleration), provide an assist control in which an acceleration level of the vehicle 10 is shifted stage by stage via the reference deceleration AC_std to achieve an appropriate one. Thus, an advantageous effect of encouraging the driver to further enjoy driving fun can be expected.

Other Embodiments

Each of a plurality of the embodiments described above is an example for realizing the present invention. Thus, those embodiments should not be used for limiting the technical scope of the present invention. The present invention can be carried out in various aspects within a scope not departing from the gist or the major features of the present invention.

In the embodiment of the present invention, for example, the number of stages set as the deceleration adjustable range of the deceleration selector 37 is described as four (see FIG. 2). The present invention is not, however, limited to the example. The number of stages set as the deceleration adjustable range of the deceleration selector 37 may be any appropriate number, taking motion performance or the like of the vehicle 10 into account.

In the embodiment of the present invention, description has been made by taking an example in which the vehicle deceleration controller 11 according to the embodiment is applied to an electric vehicle equipped with only a motor generator as a power source (not equipped with an internal combustion engine). The present invention is not, however, limited to the example. It is to be understood that the present invention can also be applied to a hybrid vehicle equipped with an internal combustion engine and the motor generator 49 as power sources.

REFERENCE NUMERALS 10 electric vehicle
11 vehicle deceleration controller 21 accelerator pedal (acceleration/deceleration operator)
25 brake pedal (brake operator)
71 target acceleration/deceleration setting part (target deceleration setting part)
73 acceleration/deceleration control part (deceleration control part)
AC_rea actual deceleration
AC_std reference deceleration
AC_dm required deceleration (required level based on deceleration operation)

The invention claimed is:

1. A vehicle deceleration controller of a vehicle including: a brake pedal that is operated when a brake request of a vehicle is inputted; and an accelerator pedal that is operated when an acceleration/deceleration request of the vehicle is inputted such that the accelerator pedal works in a single pedal mode in which acceleration/deceleration control is performed in accordance with an amount of pedal depression/returning of the accelerator pedal, the vehicle deceleration controller comprising:
a processor that, when the accelerator pedal is operated to decelerate the vehicle, sets a target deceleration based on the deceleration operation and provides deceleration control over the vehicle such that an actual deceleration follows the set target deceleration,
wherein, in a case where the brake pedal and the accelerator pedal are operated simultaneously, when a required level based on a deceleration operation of the accelerator pedal is present nearer an acceleration side, compared to a previously-set reference deceleration, then the processor provides deceleration control over the vehicle, such that an actual deceleration follows the reference deceleration, so as to avoid a sudden deceleration.

2. The vehicle deceleration controller according to claim 1,
wherein, in the case where the brake pedal and the accelerator pedal are operated simultaneously, when a required level based on a deceleration operation of the accelerator pedal is present nearer a deceleration side, compared to the reference deceleration, the processor provides deceleration control over the vehicle, such that an actual deceleration follows a required deceleration based on operations of the brake pedal and the accelerator pedal.

3. The vehicle deceleration controller according to claim 2,
wherein the target deceleration is set to fall within a prescribed deceleration adjustable range previously set for the vehicle, and
wherein the reference deceleration is set to a value having the smallest deceleration in the deceleration adjustable range.

4. The vehicle deceleration controller according to claim 2,
wherein, in a case where, during the deceleration control over the vehicle such that the actual deceleration follows the required deceleration based on the operations of the brake pedal and the accelerator pedal, when the required level shifts toward the acceleration side, compared to the reference deceleration, the processor provides deceleration control over the vehicle such that the actual deceleration follows the reference deceleration.

5. The vehicle deceleration controller according to claim 1,
wherein the target deceleration is set to fall within a prescribed deceleration adjustable range previously set for the vehicle, and
wherein the reference deceleration is set to a value having the smallest deceleration in the deceleration adjustable range.

6. The vehicle deceleration controller according to claim 1,
wherein, during the deceleration control over the vehicle such that the actual deceleration follows the reference deceleration, when the required level shifts toward the deceleration side, compared to the reference deceleration, the processor provides deceleration control over the vehicle such that the actual deceleration follows the required deceleration based on operations of the brake pedal and the accelerator pedal.

* * * * *